(12) United States Patent
Hughes et al.

(10) Patent No.: US 7,568,927 B2
(45) Date of Patent: Aug. 4, 2009

(54) SEPARABLE INSULATED CONNECTOR SYSTEM

(75) Inventors: David Charles Hughes, Rubicon, WI (US); Paul Michael Roscizewski, Eagle, WI (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 11/738,948

(22) Filed: Apr. 23, 2007

(65) Prior Publication Data

US 2008/0261465 A1    Oct. 23, 2008

(51) Int. Cl.
*H01R 13/53*    (2006.01)
(52) U.S. Cl. ....................................... 439/181
(58) Field of Classification Search .................. 439/889, 439/88, 190, 912, 921, 206, 89, 181, 183, 439/184, 185, 198, 205
See application file for complete search history.

(56) References Cited

U.S. PATENT DOCUMENTS

| | | | |
|---|---|---|---|
| 1,903,956 A | 4/1933 | Christie et al. | |
| 2,953,724 A | 9/1960 | Hilfiker et al. | |
| 3,115,329 A | 12/1963 | Wing et al. | |
| 3,315,132 A | 4/1967 | Raymond | |
| 3,392,363 A | 7/1968 | Geis, Jr. et al. | |
| 3,471,669 A | 10/1969 | Curtis | |
| 3,474,386 A | 10/1969 | Link | |
| 3,509,516 A | 4/1970 | Phillips | |
| 3,509,518 A | 4/1970 | Phillips | |
| 3,513,425 A | 5/1970 | Arndt | |
| 3,539,972 A | 11/1970 | Silva et al. | |
| 3,542,986 A | 11/1970 | Kotski | |
| 3,546,535 A | 12/1970 | Van Riemsdijk | |
| 3,576,493 A | 4/1971 | Tachick et al. | |
| 3,594,685 A | 7/1971 | Cunningham | |
| 3,652,975 A | 3/1972 | Keto | |
| 3,654,590 A | 4/1972 | Brown | |
| 3,663,928 A | 5/1972 | Keto | |
| 3,670,287 A | 6/1972 | Keto | |
| 3,678,432 A | 7/1972 | Boliver | |
| 3,720,904 A | 3/1973 | De Sio | |
| 3,725,846 A | 4/1973 | Strain | |
| 3,740,503 A | 6/1973 | Tomohiro et al. | |
| 3,740,511 A | 6/1973 | Westmoreland | |
| 3,798,586 A | 3/1974 | Huska | |
| 3,826,860 A | 7/1974 | De Sio et al. | |
| 3,845,233 A | 10/1974 | Burton | |
| 3,860,322 A | 1/1975 | Sankey et al. | |
| 3,915,534 A | 10/1975 | Yonkers | |

(Continued)

FOREIGN PATENT DOCUMENTS

DE    3110609    10/1982

(Continued)

OTHER PUBLICATIONS

U.S. Appl. No. 11/809,508, Hughes et al.

(Continued)

*Primary Examiner*—Edwin A. Leon
(74) *Attorney, Agent, or Firm*—King & Spalding LLP

(57) ABSTRACT

Separable insulated connector systems for power distribution systems wherein the interfaces of the mating connectors are modified to reduce mating and separation force.

20 Claims, 20 Drawing Sheets

U.S. PATENT DOCUMENTS

| | | |
|---|---|---|
| 3,924,914 A | 12/1975 | Banner |
| 3,945,699 A | 3/1976 | Westrom |
| 3,949,343 A | 4/1976 | Yonkers |
| 3,953,099 A | 4/1976 | Wilson |
| 3,955,874 A | 5/1976 | Boliver |
| 3,957,332 A | 5/1976 | Lambert, III |
| 3,960,433 A | 6/1976 | Boliver |
| 4,029,380 A | 6/1977 | Yonkers |
| 4,040,696 A | 8/1977 | Wada et al. |
| 4,067,636 A | 1/1978 | Boliver et al. |
| 4,088,383 A | 5/1978 | Fischer et al. |
| 4,102,608 A | 7/1978 | Balkau et al. |
| 4,103,123 A | 7/1978 | Marquardt |
| 4,107,486 A | 8/1978 | Evnas |
| 4,113,339 A | 9/1978 | Eley |
| 4,123,131 A | 10/1978 | Pearce, Jr. et al. |
| 4,152,643 A | 5/1979 | Schweitzer |
| 4,154,993 A | 5/1979 | Kumbera et al. |
| 4,161,012 A | 7/1979 | Cunningham |
| 4,163,118 A | 7/1979 | Marien et al. |
| 4,170,394 A * | 10/1979 | Conway .................... 439/184 |
| 4,186,985 A | 2/1980 | Stepniak et al. |
| 4,203,017 A | 5/1980 | Lee |
| 4,210,381 A | 7/1980 | Borgstrom |
| 4,223,179 A | 9/1980 | Lusk et al. |
| 4,260,214 A | 4/1981 | Dorn |
| 4,343,356 A | 8/1982 | Riggs et al. |
| 4,353,611 A | 10/1982 | Siebens et al. |
| 4,354,721 A | 10/1982 | Luzzi |
| 4,360,967 A | 11/1982 | Luzzi et al. |
| 4,443,054 A | 4/1984 | Ezawa et al. |
| 4,463,227 A | 7/1984 | Dizon et al. |
| 4,484,169 A | 11/1984 | Nishikawa |
| 4,500,935 A | 2/1985 | Tsuruta et al. |
| 4,508,413 A | 4/1985 | Bailey |
| 4,568,804 A | 2/1986 | Leuhring |
| 4,600,260 A | 7/1986 | Stepniak et al. |
| 4,626,755 A | 12/1986 | Butcher et al. |
| 4,638,403 A | 1/1987 | Amano et al. |
| 4,678,253 A | 7/1987 | Hicks et al. |
| 4,688,013 A | 8/1987 | Nishikawa et al. |
| 4,700,258 A | 10/1987 | Farmer |
| 4,715,104 A | 12/1987 | Schoenwetter et al. |
| 4,722,694 A | 2/1988 | Makal et al. |
| 4,767,894 A | 8/1988 | Schombourg |
| 4,767,941 A | 8/1988 | Brand et al. |
| 4,779,341 A | 10/1988 | Roscizewski |
| 4,793,637 A | 12/1988 | Laipply et al. |
| 4,799,895 A | 1/1989 | Borgstrom |
| 4,820,183 A | 4/1989 | Knapp et al. |
| 4,822,291 A | 4/1989 | Cunningham |
| 4,822,951 A | 4/1989 | Wilson et al. |
| 4,834,677 A | 5/1989 | Archang |
| 4,857,021 A | 8/1989 | Boliver et al. |
| 4,863,392 A | 9/1989 | Borgstrom et al. |
| 4,867,687 A | 9/1989 | Williams et al. |
| 4,871,888 A | 10/1989 | Bestel |
| 4,891,016 A | 1/1990 | Luzzi et al. |
| 4,911,655 A | 3/1990 | Pinyan et al. |
| 4,946,393 A | 8/1990 | Borgstrom |
| 4,955,823 A | 9/1990 | Luzzi |
| 4,972,049 A | 11/1990 | Muench |
| 4,982,059 A | 1/1991 | Bestel |
| 5,025,121 A | 6/1991 | Allen et al. |
| 5,045,656 A | 9/1991 | Kojima |
| 5,045,968 A | 9/1991 | Suzuyama et al. |
| 5,053,584 A | 10/1991 | Chojnowski |
| 5,101,080 A | 3/1992 | Ferenc |
| 5,114,357 A | 5/1992 | Luzzi |
| 5,128,824 A | 7/1992 | Yaworski et al. |
| 5,130,495 A | 7/1992 | Thompson |
| 5,166,861 A | 11/1992 | Krom |
| 5,175,403 A | 12/1992 | Hamm et al. |
| 5,213,517 A | 5/1993 | Kerek et al. |
| 5,221,220 A | 6/1993 | Roscizewski |
| 5,230,142 A | 7/1993 | Roscizewski |
| 5,230,640 A | 7/1993 | Tardif |
| 5,248,263 A | 9/1993 | Sakurai et al. |
| 5,266,041 A | 11/1993 | De Luca |
| 5,277,605 A | 1/1994 | Roscizewski et al. |
| 5,356,304 A | 10/1994 | Colleran |
| 5,358,420 A | 10/1994 | Cairns et al. |
| 5,359,163 A | 10/1994 | Woodard |
| 5,393,240 A | 2/1995 | Makal et al. |
| 5,422,440 A | 6/1995 | Palma |
| 5,427,538 A | 6/1995 | Knapp et al. |
| 5,429,519 A | 7/1995 | Murakami et al. |
| 5,433,622 A | 7/1995 | Galambos |
| 5,435,747 A | 7/1995 | Franckx et al. |
| 5,445,533 A | 8/1995 | Roscizewski et al. |
| 5,468,164 A | 11/1995 | Demissy |
| 5,492,487 A | 2/1996 | Cairns et al. |
| 5,525,069 A | 6/1996 | Roscizewski et al. |
| 5,589,671 A | 12/1996 | Hackbarth et al. |
| 5,619,021 A | 4/1997 | Yamamoto et al. |
| 5,641,310 A | 6/1997 | Tiberio, Jr. |
| 5,655,921 A | 8/1997 | Makal |
| 5,661,280 A | 8/1997 | Kuss et al. |
| 5,667,060 A | 9/1997 | Luzzi |
| 5,717,185 A | 2/1998 | Smith |
| 5,736,705 A | 4/1998 | Bestel et al. |
| 5,737,874 A | 4/1998 | Sipos et al. |
| 5,747,765 A | 5/1998 | Bestel et al. |
| 5,747,766 A | 5/1998 | Waino et al. |
| 5,757,260 A | 5/1998 | Smith et al. |
| 5,766,030 A | 6/1998 | Suzuki |
| 5,766,517 A | 6/1998 | Goedde et al. |
| 5,795,180 A | 8/1998 | Siebens |
| 5,808,258 A | 9/1998 | Luzzi |
| 5,816,835 A | 10/1998 | Meszaros |
| 5,846,093 A | 12/1998 | Muench et al. |
| 5,857,862 A | 1/1999 | Muench et al. |
| 5,864,942 A | 2/1999 | Luzzi |
| 5,912,604 A | 6/1999 | Harvey et al. |
| 5,917,167 A | 6/1999 | Bestel |
| 5,936,825 A | 8/1999 | DuPont |
| 5,949,641 A | 9/1999 | Walker et al. |
| 5,953,193 A | 9/1999 | Ryan |
| 5,957,712 A | 9/1999 | Stepniak |
| 6,022,247 A | 2/2000 | Akiyama et al. |
| 6,040,538 A | 3/2000 | French et al. |
| 6,042,407 A | 3/2000 | Scull et al. |
| 6,069,321 A | 5/2000 | Wagener et al. |
| 6,130,394 A | 10/2000 | Hogl |
| 6,168,447 B1 | 1/2001 | Stepniak et al. |
| 6,205,029 B1 | 3/2001 | Byre et al. |
| 6,213,799 B1 | 4/2001 | Jazowski et al. |
| 6,220,888 B1 | 4/2001 | Correa |
| 6,227,908 B1 | 5/2001 | Aumeier |
| 6,250,950 B1 | 6/2001 | Pallai |
| 6,280,659 B1 | 8/2001 | Sundin |
| 6,332,785 B1 | 12/2001 | Muench, Jr. et al. |
| 6,338,637 B1 | 1/2002 | Muench, Jr. et al. |
| 6,362,445 B1 | 3/2002 | Mearchland et al. |
| 6,364,216 B1 | 4/2002 | Martin |
| 6,416,338 B1 | 7/2002 | Berlovan |
| 6,453,776 B1 | 9/2002 | Beattie et al. |
| 6,504,103 B1 | 1/2003 | Meyer et al. |
| 6,517,366 B2 | 2/2003 | Bertini et al. |
| 6,520,795 B1 | 2/2003 | Jazowski |
| 6,538,312 B1 | 3/2003 | Peterson et al. |
| 6,542,056 B2 | 4/2003 | Nerstron et al. |
| 6,566,996 B1 | 5/2003 | Douglass et al. |
| 6,585,531 B1 | 7/2003 | Stepniak et al. |

| | | | |
|---|---|---|---|
| 6,664,478 B2 | 12/2003 | Mohan et al. | |
| 6,674,159 B1 | 1/2004 | Peterson et al. | |
| 6,689,947 B2 | 2/2004 | Ludwig | |
| 6,705,898 B2 | 3/2004 | Pechstein et al. | |
| 6,709,294 B1 | 3/2004 | Cohen et al. | |
| 6,733,322 B2 | 5/2004 | Boemmel et al. | |
| 6,744,255 B1 | 6/2004 | Steinbrecher et al. | |
| 6,790,063 B2 | 9/2004 | Jazowski et al. | |
| 6,796,820 B2 | 9/2004 | Jazowski et al. | |
| 6,809,413 B1 | 10/2004 | Peterson et al. | |
| 6,811,418 B2 | 11/2004 | Jazowski et al. | |
| 6,830,475 B2 | 12/2004 | Jazowski et al. | |
| 6,843,685 B1 | 1/2005 | Borgstrom et al. | |
| 6,888,086 B2 | 5/2005 | Daharsh et al. | |
| 6,905,356 B2 | 6/2005 | Jazowski et al. | |
| 6,936,947 B1 | 8/2005 | Leijon et al. | |
| 6,939,151 B2 | 9/2005 | Borgstrom et al. | |
| 6,972,378 B2 | 12/2005 | Schomer et al. | |
| 6,984,791 B1 | 1/2006 | Meyer et al. | |
| 7,018,236 B2 | 3/2006 | Nishio et al. | |
| 7,019,606 B2 | 3/2006 | Williams et al. | |
| 7,044,760 B2 | 5/2006 | Borgstrom et al. | |
| 7,044,769 B2 | 5/2006 | Zhao et al. | |
| 7,050,278 B2 | 5/2006 | Poulsen | |
| 7,059,879 B2 | 6/2006 | Krause et al. | |
| 7,077,672 B2 | 7/2006 | Krause et al. | |
| 7,079,367 B1 | 7/2006 | Liljestrand | |
| 7,083,450 B1 | 8/2006 | Hughes | |
| 7,104,822 B2 | 9/2006 | Jazowski et al. | |
| 7,104,823 B2 | 9/2006 | Jazowski et al. | |
| 7,108,568 B2 | 9/2006 | Jazowski et al. | |
| 7,134,889 B2 | 11/2006 | Hughes et al. | |
| 7,150,098 B2 | 12/2006 | Borgstrom et al. | |
| 7,168,983 B2 | 1/2007 | Graf et al. | |
| 7,170,004 B2 | 1/2007 | Gramespacher et al. | |
| 7,182,647 B2 | 2/2007 | Muench et al. | |
| 7,212,389 B2 | 5/2007 | Hughes | |
| 7,216,426 B2 | 5/2007 | Borgstrom et al. | |
| 7,234,980 B2 | 6/2007 | Jazowski et al. | |
| 7,247,061 B2 | 7/2007 | Hoxha et al. | |
| 7,247,266 B2 | 7/2007 | Bolcar | |
| 7,258,585 B2 | 8/2007 | Hughes et al. | |
| 7,278,889 B2 | 10/2007 | Muench et al. | |
| 7,341,468 B2 | 3/2008 | Hughes et al. | |
| 7,384,287 B2 * | 6/2008 | Hughes et al. | 439/181 |
| 2001/0008810 A1 | 7/2001 | George et al. | |
| 2002/0055290 A1 | 5/2002 | Jazowski et al. | |
| 2003/0228779 A1 | 12/2003 | Jazowski et al. | |
| 2004/0121657 A1 | 6/2004 | Muench et al. | |
| 2005/0208808 A1 | 9/2005 | Jazowski et al. | |
| 2005/0212629 A1 | 9/2005 | William et al. | |
| 2005/0260876 A1 | 11/2005 | Krause et al. | |
| 2006/0110983 A1 | 5/2006 | Muench et al. | |
| 2006/0160388 A1 | 7/2006 | Hughes et al. | |
| 2006/0216992 A1 | 9/2006 | Hughes et al. | |
| 2007/0026713 A1 | 2/2007 | Hughes et al. | |
| 2007/0026714 A1 | 2/2007 | Hughes et al. | |
| 2007/0032110 A1 | 2/2007 | Hughes et al. | |
| 2007/0097601 A1 | 5/2007 | Hughes et al. | |
| 2007/0108164 A1 | 5/2007 | Muench et al. | |

FOREIGN PATENT DOCUMENTS

| | | |
|---|---|---|
| DE | 3521365 | 2/1987 |
| DE | 19906972 A1 | 2/1999 |
| EP | 0624940 | 11/1994 |
| EP | 0782162 A2 | 7/1997 |
| EP | 0957496 | 11/1999 |
| FR | 2508729 | 12/1982 |
| GB | 105227 | 2/1918 |
| GB | 2254493 | 10/1992 |
| JP | S62-198677 | 12/1987 |
| JP | S63-93081 | 6/1988 |
| JP | H1-175181 | 7/1989 |
| JP | H3-88279 | 9/1991 |
| JP | H4-54164 | 5/1992 |
| WO | WO 00/41199 | 7/2000 |

OTHER PUBLICATIONS

U.S. Appl. No. 11/738,995, Steinbrecher et al.
U.S. Appl. No. 11/738,941, Hughes et al.
U.S. Appl. No. 11/688,673, Hughes et al.
U.S. Appl. No. 11/688,648, Hughes et al.
U.S. Appl. No. 11/677,703, Hughes et al.
U.S. Appl. No. 11/676,861, Hughes et al.
Loadbreak Apparatus Connectors Service Information 500-26, Cooper Power Systems, May 2003, Waukesha, WI.
Deadbreak Apparatus Connectors Electrical Apparatus, Cooper Power Systems, Jul. 1999, Marketing Material.
Link-Op 600A Operable Connector System, Marketing Material.
Installation Instructions, 650LK-B Link Operable Connector System (Bolted) May 1, 1989.
G&W Electric Co.; "Breakthrough in Switching Technology; Solid Dielectric Switchgear"; Oct. 2001; Blue Island, IL. cited by other.
Cooper Power Systems; "Padmounted Switchgear; Type RVAC, Vacuum-Break Switch, Oil-Insulated or SF.sub.6-Insulated; Electrical Apparatus 285-50"; Jul. 1998. cited by other.
Cooper Power Systems; "Padmounted Switchgear; Type MOST Oil Switch; Electrical Apparatus 285-20"; Jul. 1998. cited by other.
Cooper Power Systems; "Molded Rubber Products; 600 A 35 kV Class Bol-T.TM. Deadbreak Connector; Electrical Apparatus 600-50"; Jan. 1990. cited by other.
Cooper Power Systems; "Padmounted Switchgear; Kyle.RTM. Type VFI Vacuum Fault Interruptes; Electrical Apparatus 285-10", Jan. 1998. cited by other.
"Loadbreak Appatus Connectors, 200 A 25kV Class—Expanded Range Loadbreak Elbow Connector, Electrical Apparatus 500-28"; Cooper Power Systems; pp. 1-4; (Jan. 2004). cited by other.
Kevin Fox, "The Cooper Posi-Break.TM. Solution to Separable Connector Switching Problems at Wisconsin Electric Power Company," Component Products, Bulletin No. 98065, copyright 1998 Cooper Power Systems, MI Oct. 1998 5M, 2 total pages. cited by other.
"The Cooper Posi-Break.TM., Elbow and Cap, Engineered Solution Increases Strike Distance and Improves Reliability," copyright 1998 Cooper Power Systems, Inc., Bulletin 98014, MI 398/15M, 6 total pages. cited by other.
Loadbreak Apparatus Connectors, "200 A 25 kV Class Loadbreak Bushing Insert," Service Information 500-26, Cooper Power Systems, May 2003, pp. 1-2. cited by other.
Loadbreak Apparatus Connectors, "200 A kV Class Cooper Posi-Break.TM. Expanded Range Loadbreak Elbow Connector," Service Information 500-29, Cooper Power Systems, Jan. 2004, pp. 1-4. cited by other.
Product Brief, "Latched Elbow Indicator," Cooper Power Systems, Bulletin 94014, Apr. 1994, 1 total page. cited by other.
"Stick-OPerable 600-Amp Connector Systems," *Elastimold, Amerace Corporation*, Feb. 1984, 11 pages.
"Molded Rubber Products, 600 A 15 kV Class T-OP™ II Deadbreak Connector Electrical Apparatus 600-12," *Cooper Power Systems*, Jul. 2005, pp. 1-4.
"Molded Rubber Products, 600 A 15 and 25 kV Deadbreak Accessories, Tools, Replacement Parts Electrical Apparatus 600-46"; *Cooper Power Systems*, Jul. 1997, pp. 1-4.
"Molded Rubber Products, 600 A 25 kV Class BT-TAP™ Deadbreak Connecor Electrical Apparatus, 600-35," *Cooper Power Systems*, Mar. 2003, pp. 1-5.
"Deadbreak Apparatus Connectors, 600 A 15/25 kV Class Bol-T™ Deadbreak Connector Electrical Apparatus 600-10," *Cooper Power Systems*, Aug. 2002, 6 pages.
"Deadbreak Apparatus Connector, 600 A 25 kV Class Bushing Adapter for T-OP™ II Connector Systems (including LRTP and Bushing Extender) Electrical Appparatus 600-38," *Cooper Power Systems*, Jun. 1997, pp. 1-4.
"Loadbreak Apparatus Connectors, 200 A 15 kV Class Loadbreak Bushing Insert 500-12," *Cooper Power Systems*, Nov. 1995, pp. 1-2.

"T-OP™ II: How Many Sticks Does It Take To Operate Your 600 Amp Terminator System?," *Cooper Power Systems*, Jul. 1994, 4 pages.

"Installation & Operation Instructions 168ALR, Access Port Loadbreak Elbow Connectors"; *Elastimold IS-168ALR (Rev C)*; pp. 1-5; (Feb. 1, 1994).

"Operating Instructions 200TC-2"; *Elastimold IS-200TC (Rev-A)*; pp. 1-2; (Feb. 26, 1995).

"Surge Arresters"; *Elastimold Catalog*; pp. 26-27; (2001).

"Surge Arresters, Metal Oxide Varistor elbow (M.O.V.E.™) Surge Arrester Electrical Apparatus 235-65"; *Cooper Power Systems*; pp. 1-4; Dec. 2003.

"Surge Arresters, Metal Oxide Elbow Surge Arrester Electrical Apparatus 235-65"; *Cooper Power Systems*; pp. 1-4; Jan. 1991.

"Surge Arresters, Metal Oxide Varistor (MOV) Parking Stand Surge Arrester Electrical Apparatus 235-68"; *Cooper Power Systems*; pp. 1-3; Apr. 2002.

"INJPLUG35, 35 kV Amp Loadbreak Injection Plug Operating and Installation Instructions"; *Cooper Power Systems*; p. 1; (Sep. 2002).

"Loadbreak Apparatus Connectors, 200 A 15 kV Class Loadbreak Elbow Connector, Electrical Apparatus 500-10"; *Cooper Power Systems*; pp. 1-4; (Feb. 2004).

"Loadbreak Apparatus Connectors, 200 A 15 kV and 25 kV Class Elbow Installation Instructions, Service Information S500-10-1"; *Cooper Power Systems*; pp. 1-4; (Feb. 2001).

"Loadbreak Apparatus Connectors, 200 A 15kV Class Loadbreak Bushing Insert 500-12"; *Cooper Power Systems*; pp. 1-2; (Nov. 1995).

"Loadbreak Apparatus Connectors, 200 A 15kV Class Loadbreak Rotatable Feedthru Insert; Electrical Apparatus 500-13"; *Cooper Power Systems*; pp. 1-2; (Apr. 2001).

"Loadbreak Apparatus Connectors, 200 A 25 kV Class—Expanded Range Loadbreak Elbow Connector, Electrical Apparatus 500-28"; *Cooper Power Systems*; pp. 1-4; (Jan. 2004).

"Loadbreak Apparatus Connectors, 200 A 25 kV Class Rotatable Feedthru Insert, Electrical Apparatus 500-30"; *Cooper Power Systems*; pp. 1-2; (Jun. 1999).

"Loadbreak Apparatus Connectors, 200 A 35 kV Class Three-Phase Loadbreak Injection Elbow Installation Instructions, Service Information S500-55-2"; *Cooper Power Systems*; pp. 1-6; (Apr. 1999).

Cooper Power Systems, *Deadbreak Apparatus Connectors*, "600 A 15/25 kV Clas Bol-T™ Deadbreak Connector", Electrical Apparatus 600-30, pp. 1-6, Feb. 2003.

Cooper Power Systems, *Deadbreak Apparatus Connectors*, "600 A 15/25 kV Class PUSH-OP® Deadbreak Connector", Electrical Apparatus 600-33, pp. 1-4, Nov. 2004.

Cooper Power systems, *Molded Rubber Products*, "600 A 15/25 kV Class T-OP™ II Deadbreak Connector", Electrical Apparatus 600-32, pp. 1-4, Jul. 2005.

Cooper Power Systems, *OEM Equipment*, "Four-Position Sectionalizing Loadbreak Switches", Electrical Apparatus 800-64, pp. 1-8, Dec. 2003.

* cited by examiner

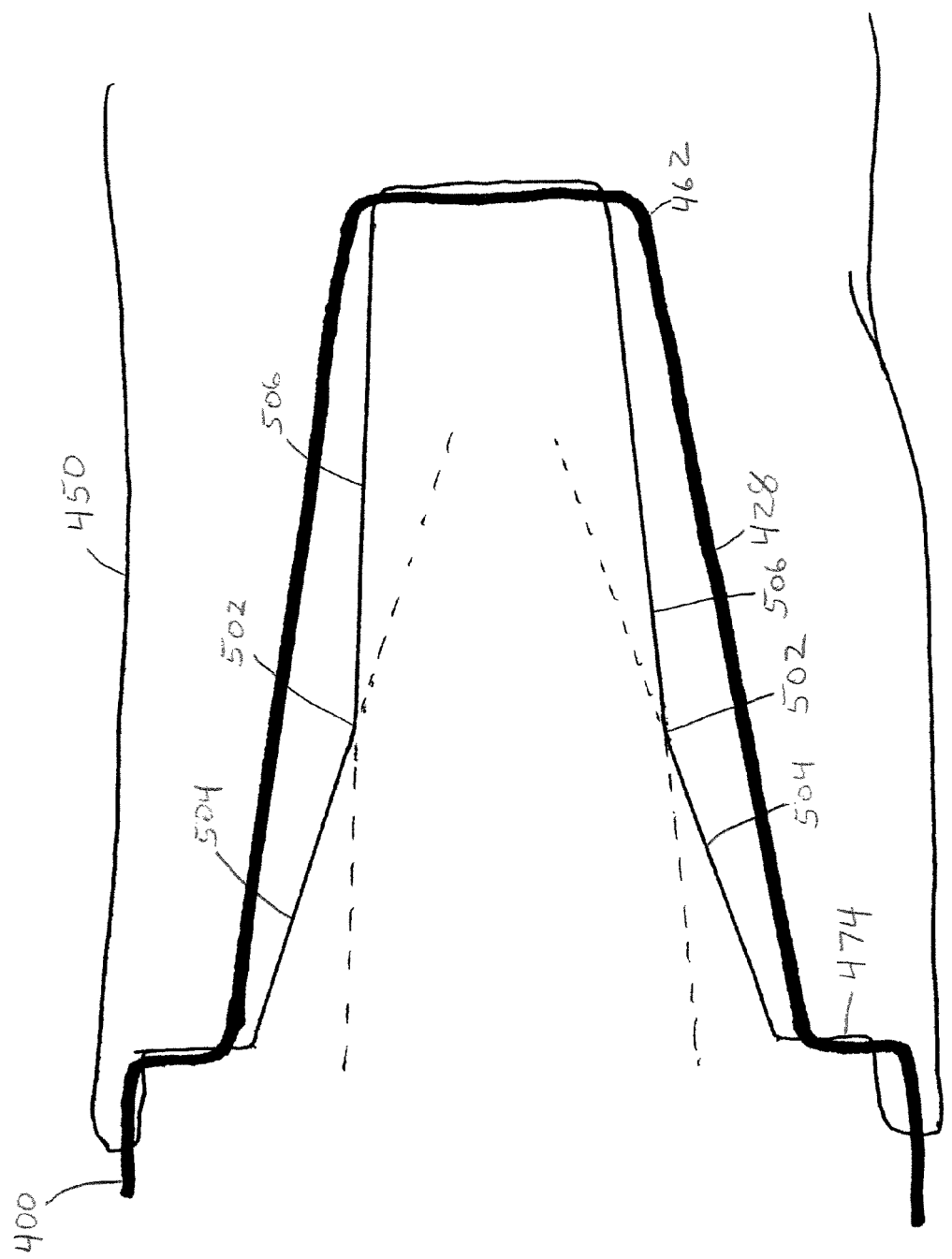

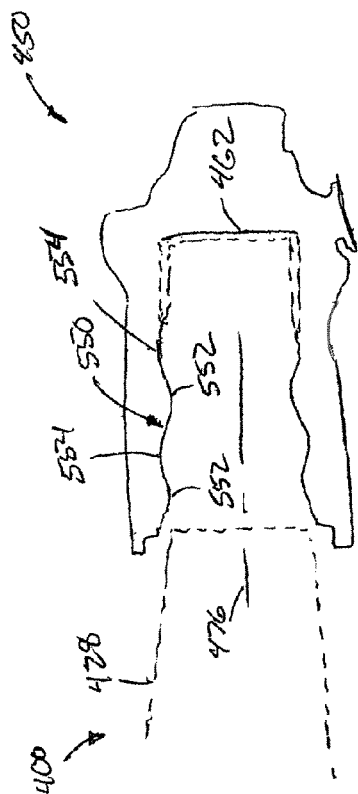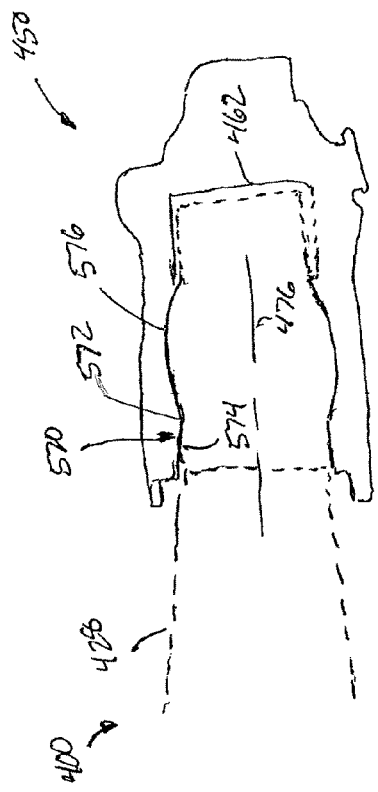

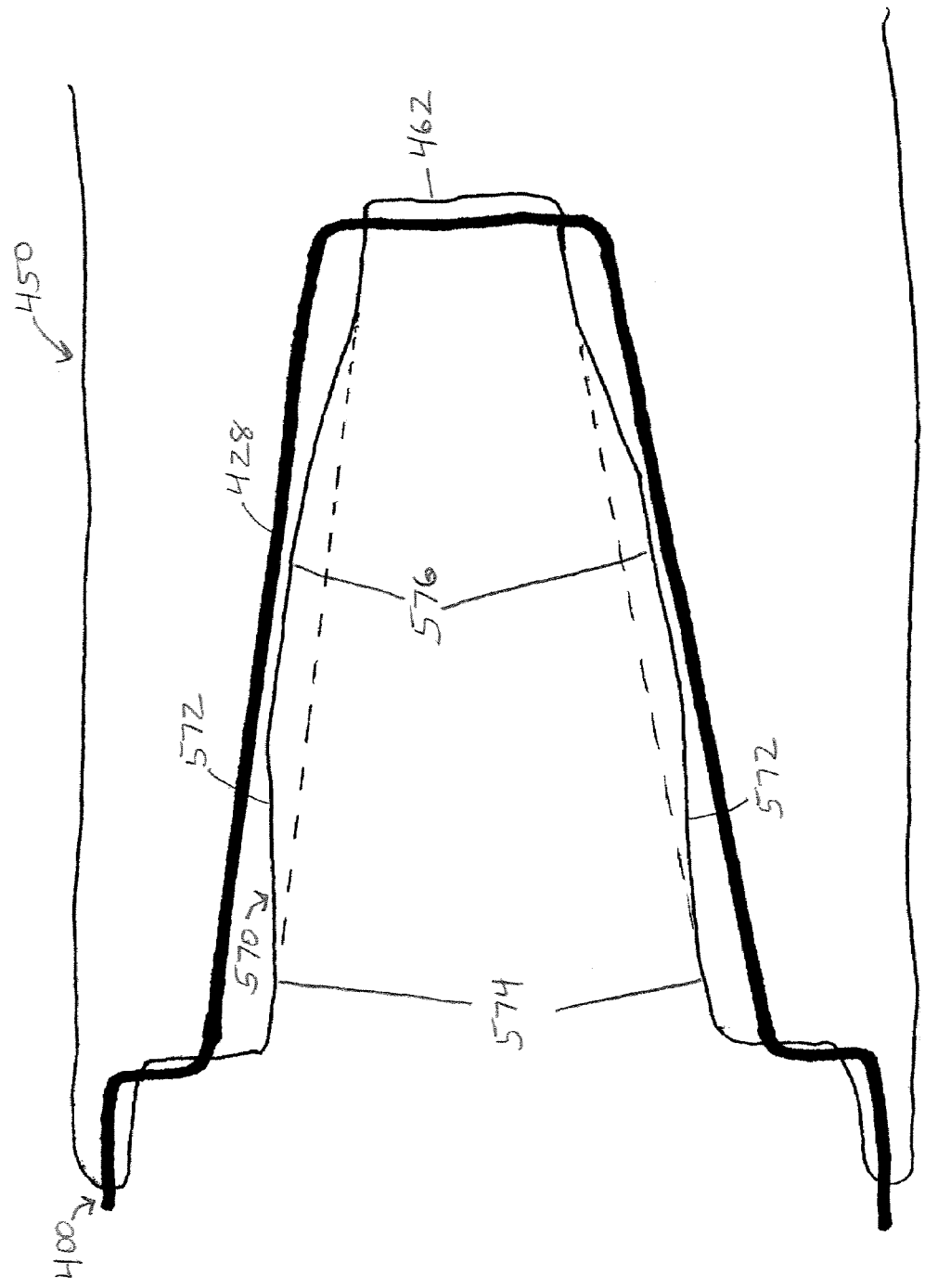

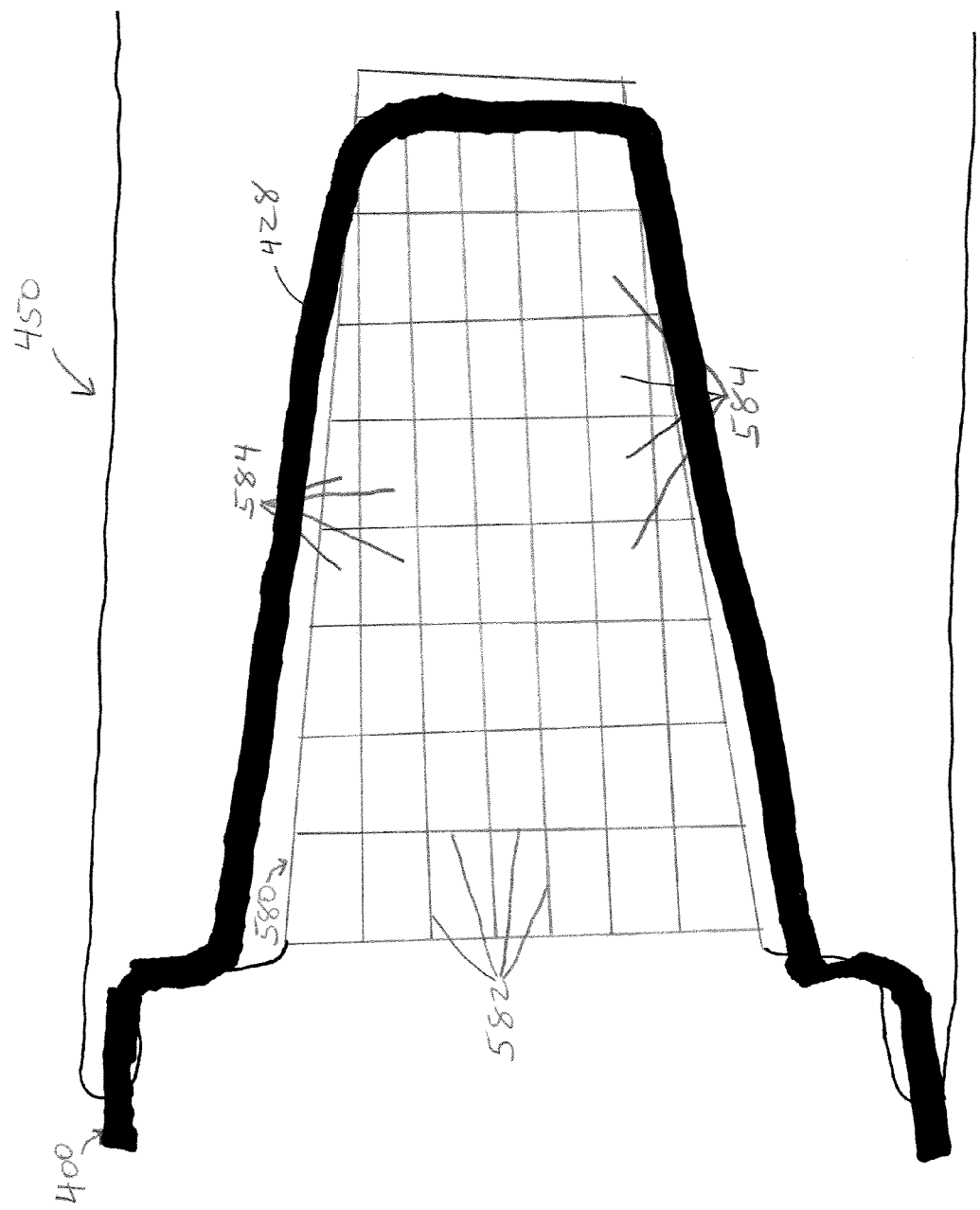

Single Taper Interface

EMS EB-Cap

| Sample | A Partial Discharge 3pC Inception | B Extinction | C 95kV* | D 1.2/50 u-s Impulse 3 +/- 125kV** | E 150kV*** | F 35kV* | G 5 min AC Withstand 40kV** | H 50kV | I 60kV** | J Impulse 150kV**** | K 70kV | L 5 min AC Withstand 75kV | M 80kV | N | O | P |
|---|---|---|---|---|---|---|---|---|---|---|---|---|---|---|---|---|
| 1 | 36 | 32 | | | | | | | | | F | | | | | |
| 2 | clean | 40 | | | P | | | P | | | F | | | | | |
| 3 | clean | 40 | | | P | | | P | | | P | P | | | | |
| 4 | 40 | 37 | | | P | | | P | | | P | P | P | | | |
| 5 | <3pc | 40 | | | P | | | P | | | P | P | P | | | |

| Sample | A Partial Discharge 3pC Inception | B Extinction | C 95kV* | D 1.2/50 u-s Impulse 3 +/- 125kV** | E 150kV*** | F 35kV* | G 5 min AC Withstand 40kV** | H 50kV | I 60kV** | J Impulse 150kV**** | K AC With. 70kV*** | L 160kV | M 1.2/50 u-s Impulse 3 +/- 170kV | N 180kV | O 190kV | P 200kV |
|---|---|---|---|---|---|---|---|---|---|---|---|---|---|---|---|---|
| 6 | 26 | 21 | | | | | | P | P | | | | | | | |
| 7 | 36 | 28 | | | P | | | P | | | F | | | | | |
| 8 | 39 | 29 | | | P | | | P | | | F | | | | | |
| 9 | 40 | 37 | | | P | | | P | | | P | P | P | P | P | P |
| 10 | <3pc | 40 | | | P | | | P | | | | | | | | |

\* Fill in only if column B is 11 to 18kV
\*\* Fill in only if column B is 19 to 25kV
\*\*\* Fill in only if column B is 26kV or higher or no inception
\*\*\*\* Do only if column E is blank Notes: Perform tests starting with column A and work right in alphabetical order.
All columns without asterisks should be completed (unless part fails).

Date: _____  Technician: _____

Dual Taper Interface

EMS FT

| Sample | A Partial Discharge 3pC Inception | B Extinction | C 95kV* | D 1.2/50 u-s Impulse 3 +/- 125kV** | E 150kV*** | F 35kV* | G 5 min AC Withstand 40kV** | H 50kV | I 60kV** | J Impulse 150kV**** | K 70kV | L 5 min AC With. 75kV | M 80kV | N | O | P |
|---|---|---|---|---|---|---|---|---|---|---|---|---|---|---|---|---|
| 1 | 29 | 26 | | | P | | | P | | | | | | | | |
| 2 | 40 | 40 | | | P | | | P | | | | | | | | |
| 3 | 40 | 40 | | | P | | | P | | | | | | | | |
| 4 | 40 | 40 | | | P | | | P | | | | | | | | |
| 5 | 23 | 20 | | P | | | P | | | P | | | | | | |

| Sample | A Partial Discharge 3pC Inception | B Extinction | C 95kV* | D 1.2/50 u-s Impulse 3 +/- 125kV** | E 150kV*** | F 35kV* | G 5 min AC Withstand 40kV** | H 50kV | I 60kV** | J Impulse 150kV**** | K AC With. 70kV*** | L 160kV | M 1.2/50 u-s Impulse 3 +/- 170kV | N 180kV | O 190kV | P 200kV |
|---|---|---|---|---|---|---|---|---|---|---|---|---|---|---|---|---|
| 6 | 40 | 40 | | | P | | | P | | | P | P | P | P | P | P |
| 7 | 40 | 40 | | | P | | | P | | | P | P | P | P | P | P |
| 8 | 40 | 40 | | | P | | | P | | | P | P | P | P | P | P |
| 9 | 40 | 40 | | | P | | | P | | | P | P | P | P | P | P |
| 10 | 40 | 40 | | | P | | | P | | | P | P | P | P | P | P | no failures

\* Fill in only if column B is 11 to 18kV
\*\* Fill in only if column B is 19 to 25kV
\*\*\* Fill in only if column B is 26kV or higher or no inception
\*\*\*\* Do only if column E is blank Date: _____  Technician: Larson

Fig. 22

SEPARABLE INSULATED CONNECTOR SYSTEM

BACKGROUND OF THE INVENTION

The invention relates generally to cable connectors for electric power systems, and more particularly to separable insulated connector systems for use with cable distribution systems.

BRIEF DESCRIPTION OF THE DRAWINGS

FIGS. 11 and 12 schematically illustrate an exemplary embodiment of an alternative connector interface for the connectors shown in FIGS. 7 and 9.

FIGS. 15 and 16 illustrate an exemplary embodiment of a third alternative for a connector interface for the connectors shown in FIGS. 7 and 9.

FIGS. 17 and 18 illustrate an exemplary embodiment of yet another alternative for a connector interface for the connectors shown in FIGS. 7 and 9.

FIG. 19 illustrates a side view of an alternative exemplary connector interface embodiment having a waffle pattern for use with the connectors shown in FIGS. 7 and 9.

FIG. 22 illustrates exemplary test data for the exemplary connector interface embodiment of FIGS. 11 and 12.

DETAILED DESCRIPTION OF THE EXEMPLARY EMBODIMENTS

Electrical power is typically transmitted from substations through cables which interconnect other cables and electrical apparatus in a power distribution network. The cables are typically terminated on bushings that may pass through walls of metal encased equipment such as capacitors, transformers or switchgear. Such cables and equipment transmit electrical power at medium and high voltages generally greater than 600V.

Separable connector systems have been developed that allow ready connection and disconnection of the cables to and from the electrical equipment. In general, two basic types of separable connector systems have conventionally been provided, namely deadbreak connector systems and livebreak connector systems.

Deadbreak connector systems require connection or disconnection of cables while the equipment and the cables are de-energized. That is deadbreak connectors are mated and separated only when there is no voltage and no load current between the contacts of the connectors and the bushings of the equipment. Deadbreak connector systems for high voltage equipment are typically rated for currents of about 600 A.

To avoid power interruptions required by deadbreak connector systems, loadbreak connector systems have been developed that allow connection and disconnection to equipment under its operating voltage and load current conditions. Loadbreak connector systems, however, are typically rated for much lower currents of about 200 A in comparison to deadbreak connector systems.

Exemplary embodiments of the inventive separable insulated connector systems are described herein below. In one exemplary embodiment, the inventive separable insulated connector systems are operable in switchgear and other electrical equipment at higher current ratings than conventional deadbreak or livebreak connector systems. The connectors may be provided at relatively low cost, and facilitate installation and removal of protection modules to the equipment without having to power down the equipment, but in a different manner from conventional livebreak connector systems. The inventive connector systems are sometimes referred to as energized break connectors, which shall refer to the making and breaking of electrical connections that are energized at their rated voltage, but not carrying load current. Such conditions may occur, for example, when protective elements such as fuses and the like operate to interrupt electrical current through a portion of the electrical equipment. The separable energized break connector systems permit the protection modules to be replaced while the equipment is energized and still in service.

In order to fully appreciate the exemplary energized break connector systems described later below, some appreciation of electrical equipment, and different types of conventional connectors, namely livebreak and deadbreak connector systems for such electrical equipment, is necessary.

A. The Electrical Equipment

Figure 1:
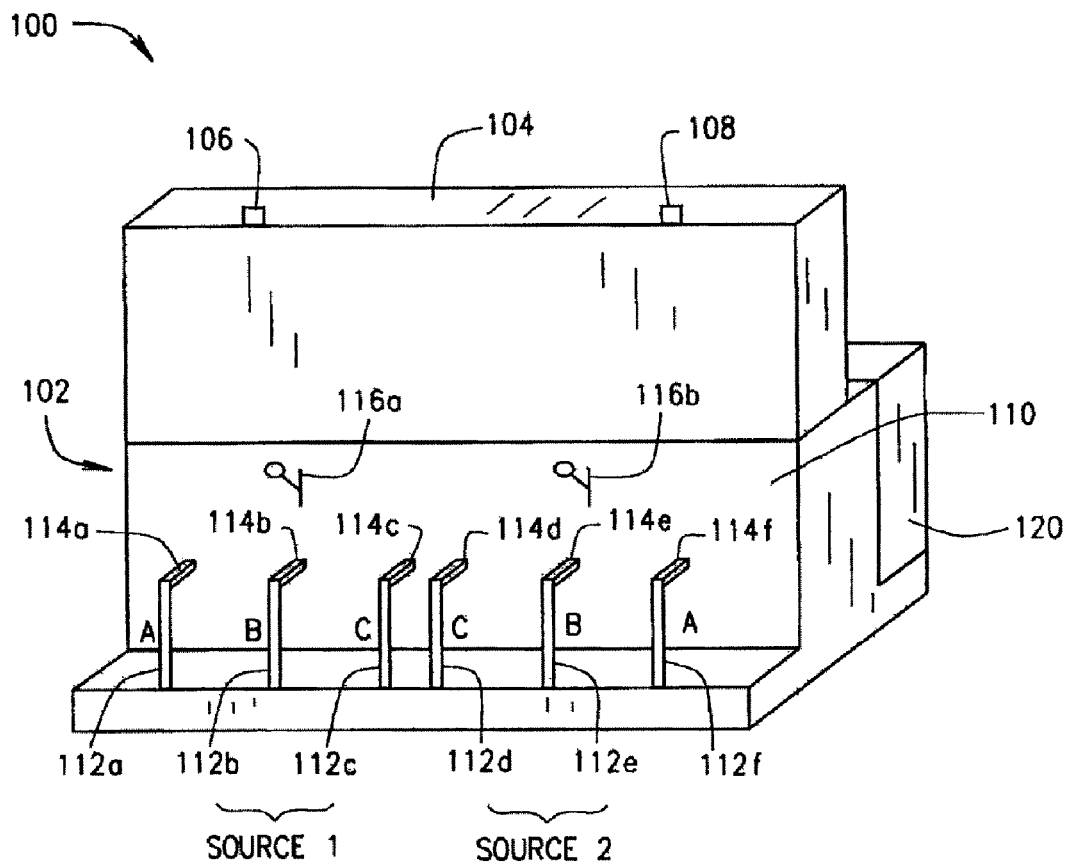
FIG. 1 is a perspective view of a known electrical switchgear viewed from a source side of the switchgear.

FIG. 1 illustrates an exemplary electrical equipment configuration 100 with which the connectors, described below, may be used. While in an exemplary embodiment the electrical equipment 100 is a particular configuration of switchgear, it is understood that the benefits of the exemplary embodiment accrue generally to switchgear of many configurations, as well as electrical equipment of different types and configurations, including but not limited to a power distribution capacitor or transformer. That is, the switchgear 100 is but one potential application of the inventive connector assemblies and systems described hereinbelow. Accordingly, the switchgear 100 is illustrated and described herein for illustrative purposes only, and is not intended to be limited to any particular type of switchgear configuration, such as the switchgear 100, or to any particular type of electrical equipment.

Figure 2:
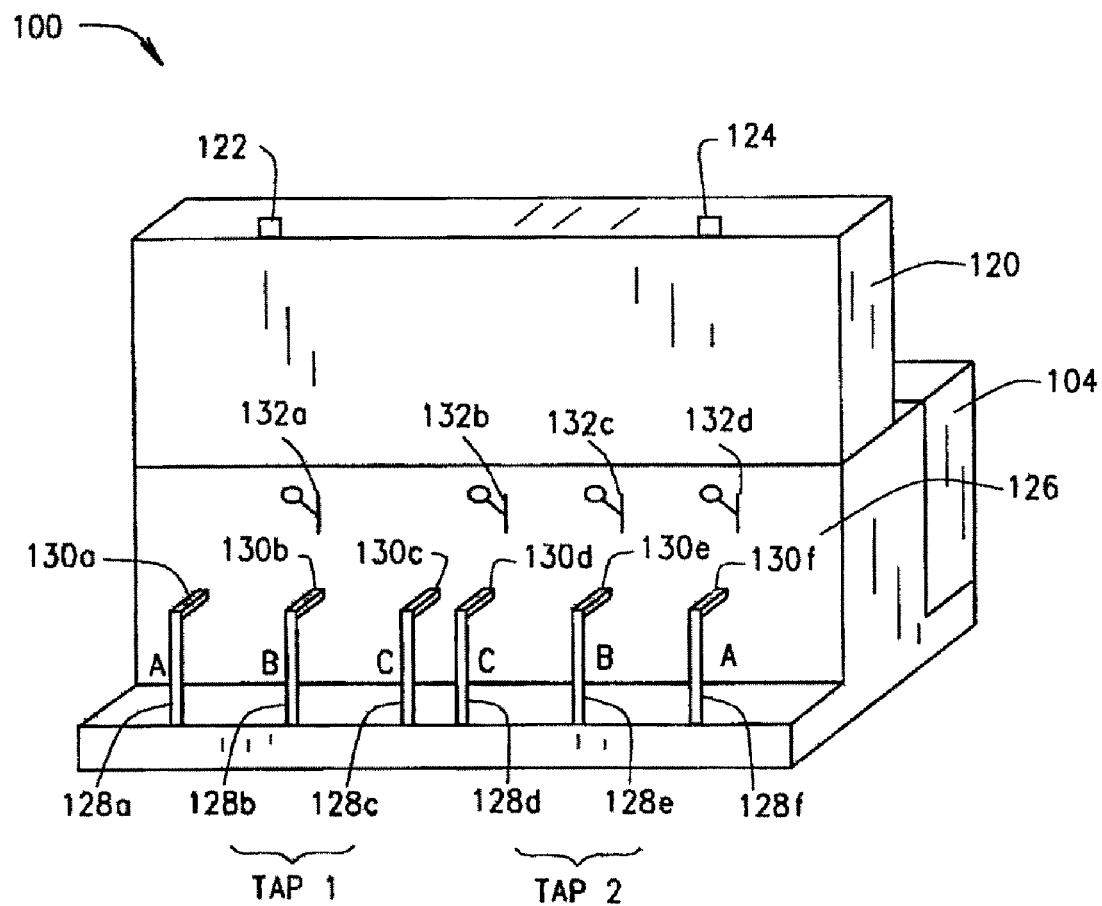
FIG. 2 is another perspective view of the switchgear shown in FIG. 1 viewed from a tap side of the switchgear.

As shown in FIG. 1, the switchgear 100 includes a protective enclosure 102 having, for example, a source side door 104 positionable between an open position (FIG. 1) and a closed position (FIG. 2). Latch elements 106 and/or 108 may be used to lock source side door 104 in a closed position. Inside the source side door 104 is a front plate 110 that forms a portion of the enclosure 102. Cables 112a-112f may be coupled to a lower end of the enclosure 102 and are connected to active switching elements (described below) in the enclosure 102, and each of the cables 112a-112f typically carry power in three phases from two different sources. For example, cables 112a-112c may carry, respectively, the A, B and C phases of power from source 1, and cables 112d-112f may carry, respectively, the C, B and A phases of power from source 2.

Cables 112a-112f may be coupled to the front-plate 110 and switchgear 100 through, for example, connector components 114a-114f that join the cables 112a-112f to respective switching elements (not shown in FIG. 1) in the enclosure 102. The switching elements may, in turn, be coupled to an internal bus bar system (not shown in FIG. 1) in the enclosure 102.

Handles or levers 116a and 116b are coupled to the enclosure 102 and may operate active switchgear elements (described below) inside the switchgear 100 to open or interrupt the flow of current through the switchgear 100 via the cables 112a-112f and electrically isolate power sources 1 and 2 from load-side or power receiving devices. The cables 112a-112c may be disconnected from the internal bus bar system by manipulating the handle 116a. Similarly, cables 112d-112f may be disconnected from the internal bus bar system by manipulating the handle 116b. Handles 116a and 116b are mounted onto the front-plate 110 as shown in FIG. 1. In an exemplary embodiment, the active switch elements on the source side of the switchgear 100 are vacuum switch assemblies (described below), and the vacuum switch assemblies may be used in combination with other types of fault interrupters and fuses in various embodiments of the invention.

One exemplary use of switchgear is to segregate a network of power distribution cables into sections such as, for example, by opening or closing the switch elements. The switch elements may be opened or closed, either locally or remotely, and the power supplied from one source to the switchgear may be prevented from being conducted to the other side of the switchgear and/or to the bus. For example, by opening the switch levers 116a and 116b, power from each of the sources 1 and 2 on one side of the switchgear is prevented from being conducted to the other side of the switchgear and to the bus and the taps. In this manner, a utility company is able to segregate a portion of the network for maintenance, either by choice, through the opening of switchgear, or automatically for safety, through the use of a fuse or fault interrupter, depending on the type of active switching elements included in the switchgear.

Figure 23:
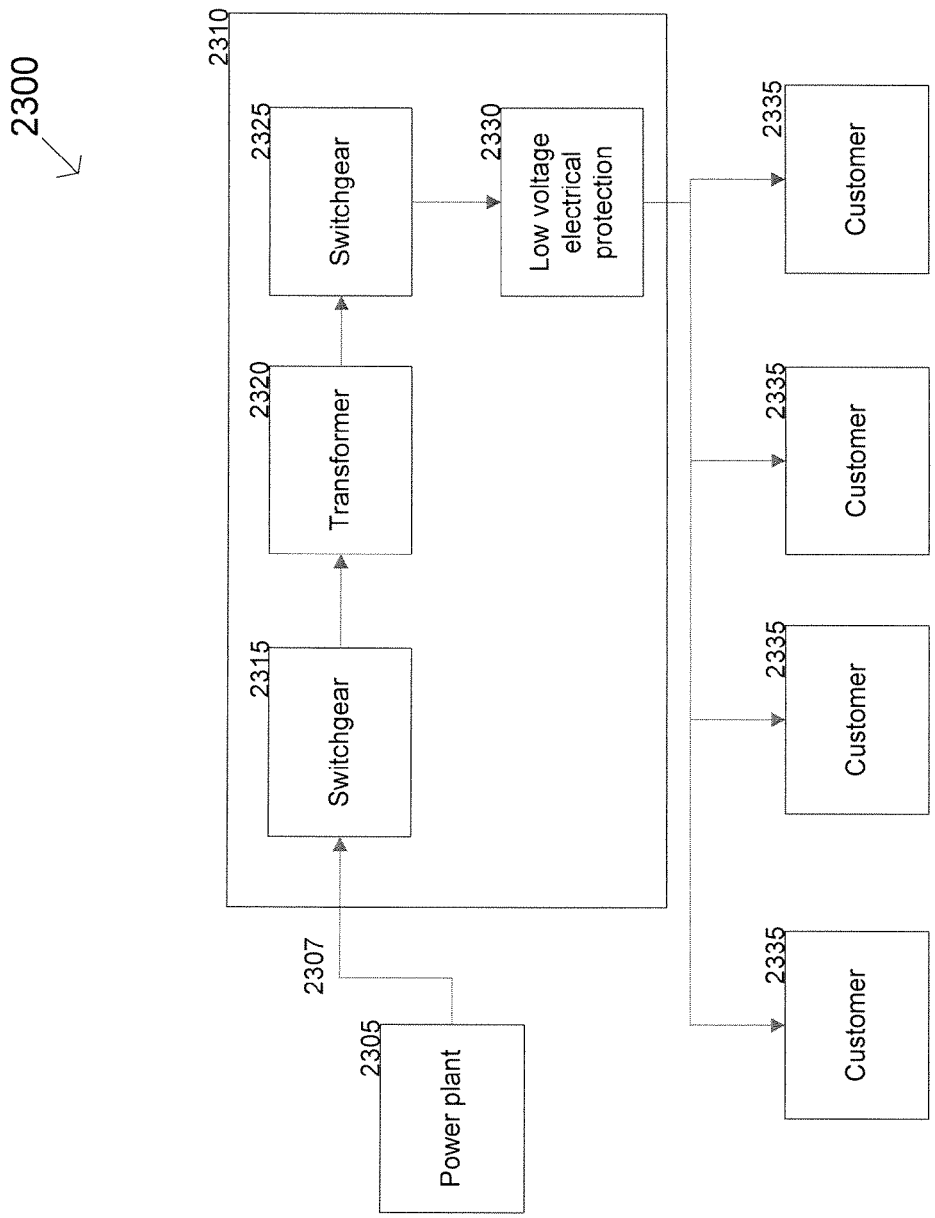
FIG. 23 illustrates an exemplary power system for use of the exemplary connectors in the switchgear of FIGS. 1 and 2.

FIG. 23 illustrates the use of the exemplary switchgear in an exemplary power distribution system 2300. A power plant 2305 or other power producing means know to those of skill in the art transmits power over high voltage cables 2307 to a substation 2310. While the current embodiment shows only one substation 2310, those of skill in the art will recognize that a number of substations may be employed between the power production facility 2305 and the customers receiving the power.

The contents of the substation have been simplified for means of explanation and can include a high voltage switchgear 2315 and a low voltage switchgear 2320 on each side of a transformer 2320. Power may then be transmitted through low voltage electrical protection 2330 before being transmitted to the customers. The low voltage electrical protection 2330 may include fuses and or circuit breakers, as well as means for connecting the cables from the second switchgear 2325 to the low voltage electrical protection 2330 and from the low voltage electrical protection 2330 to the customers 2335. The switchgears 2315 and 2325 are typically located on both the high voltage and low voltage side of the power transformer 2320 as shown in FIG. 23. The substation may also include fuses (not shown) to protect the transformer 2320.

The transformer 2320 transfers energy from one electrical circuit to another by magnetic coupling. The transformer 2320 typically includes two or more coupled windings and a magnetic core to concentrate magnetic flux. A voltage applied to one winding creates a time-varying magnetic flux in the core, which induces a voltage in the other windings. Varying the relative number of turns determines the voltage ratio between the windings, thus transforming the voltage from one circuit to another.

FIG. 2 illustrates another side of the switchgear 100 including a tap side door 120 that is positionable between open (shown in FIG. 2) and closed (FIG. 1) positions in an exemplary embodiment. Latch elements 122 and/or 124 may be used to lock the tap side door 120 in the closed position. Inside the tap door 120 is a front-plate 126 that defines a portion of the enclosure 102. Six cables 128a-128f may be connected to a lower side of the switchgear 100, and each of the respective cables 128a-128f typically carries, for example, one phase of power away from switchgear 100. For example, cable 128a may carry A phase power, cable 128b may carry B phase power and cable 128c may carry C phase power. Similarly, cable 128d may carry C phase power, cable 128e may carry B phase power and cable 128f may carry A phase power. Connectors 130a-130f connect cables 128a-128f to switchgear.

It should be noted that the exemplary switchgear 100 in FIGS. 1 and 2 shows one only one exemplary type of phase configuration, namely an ABC CBA configuration from left to right in FIG. 2 so that the corresponding cables 128a-128c and 128d-128f carry the respective phases ABC and CBA in the respective tap 1 and tap 2. It is understood, however, that other phase configurations may be provided in other embodiments, including but not limited AA BB CC so that cables 128a and 128b each carry A phases of current, cables 128c and 128d each carry B phases of current, and so that cables 128e and 128f each carry C phases of current. Still other configurations of switchgear may have one or more sources and taps on the same front-plate 110 (FIG. 1) or 126 (FIG. 2), or on the sides of the switchgear on one or more additional front plates. It also contemplated that each phase may be designated by a number, such as 1, 2 and 3, and that the switchgear may accommodate more or less than three phases of power. Thus, a switchgear may have, for example only, a configuration of 123456 654321 on the tap side of the switchgear 100.

A frame may be positioned internal to the switchgear and provide support for the active switching elements as well as the bus bar system, described below. In other words, the frame holds the active switching elements and bus bar system in place once they are coupled to the frame. The frame is oriented to allow portions of the active switching elements, typically bushings, to protrude as a bushing plane so that connections to the various cables can be made.

In an exemplary embodiment, a lever or handle 132a operates active switchgear elements, as described below, inside the switchgear 100 to disconnect cables 128a, 128b, 128c from the internal bus bar system. Similarly, handles 132b-

132d cause one of individual cables 128d, 128e, 128f to disconnect and connect, respectively, from the internal bus bar system. In an exemplary embodiment, the active switchgear elements on the tap side of the switchgear 100 include vacuum interrupter assemblies (described below), and the vacuum interrupter assemblies may be used in combination with fuses and various types of fault interrupters in further and/or alternative embodiments.

Figure 3:
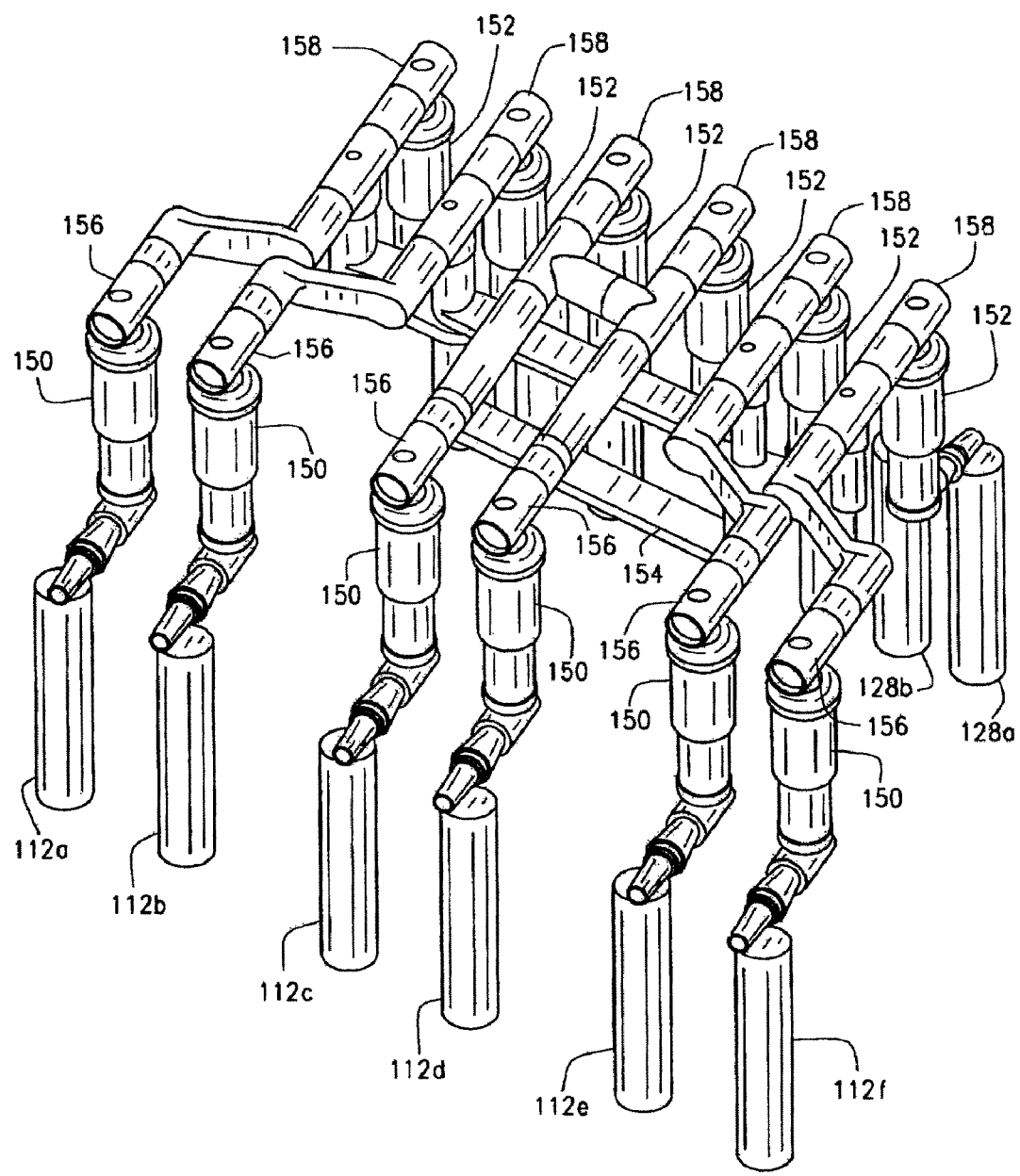
FIG. 3 is a perspective view of internal components of the switchgear shown in FIGS. 1 and 2.

FIG. 3 is a perspective view of exemplary internal components of the switchgear 100 removed from the enclosure 102 and without the supporting frame. Switch element assemblies 150 and protective element assemblies 152 such as fuses, breakers, interrupter assemblies and the like may be positioned on opposites sides (i.e., the source side and the tap side, respectively) of the switchgear assembly. Cables 112a-112f may be connected to respective switch element assemblies 150, and cables 128a-128f (cables 128c-128f not labeled in FIG. 3) may be connected to the respective interrupter element assemblies 152.

A bus bar system 154 may be situated in between and may interconnect the switch element or interrupter assemblies 150 and 152 via connectors 156 and 158. In different embodiments, the bus bar system 154 includes conventional metal bar members formed or bent around one another, or a modular cable bus and connector system. The modular cable bus system may be assembled with mechanical and push-on connections into various configurations, orientations of phase planes, and sizes of bus bar systems. In still another embodiment, molded solid dielectric bus bar members may be provided in modular form with push-on mechanical connectors to facilitate various configurations of bus bar systems with a reduced number of component parts. In still other embodiments, other known bus bar systems may be employed as those in the art will appreciate.

When certain types of protective elements 152 are utilized in the switchgear, it may be necessary to replace the protective elements 152 as they operate to interrupt the circuit path. In particular, when fuses are utilized in the elements 152 and the fuse elements open a current path through the respective protective element 152, it must be removed and replaced to restore the electrical connection. In such a circumstance, an opened fuse remains at its operating voltage potential or rated voltage, but carries no load current because the current path through the fuse is opened. An opened fuse or fuses in the respective protective elements 152 may impair the full power service of the switchgear to some degree by interrupting or reducing power supply to loads and equipment directly connected to the opened fuse(s), while protective elements 152 that have not opened may continue to supply electrical power to other electrical loads and equipment.

B. Conventional Loadbreak Connector Systems

Figure 4:
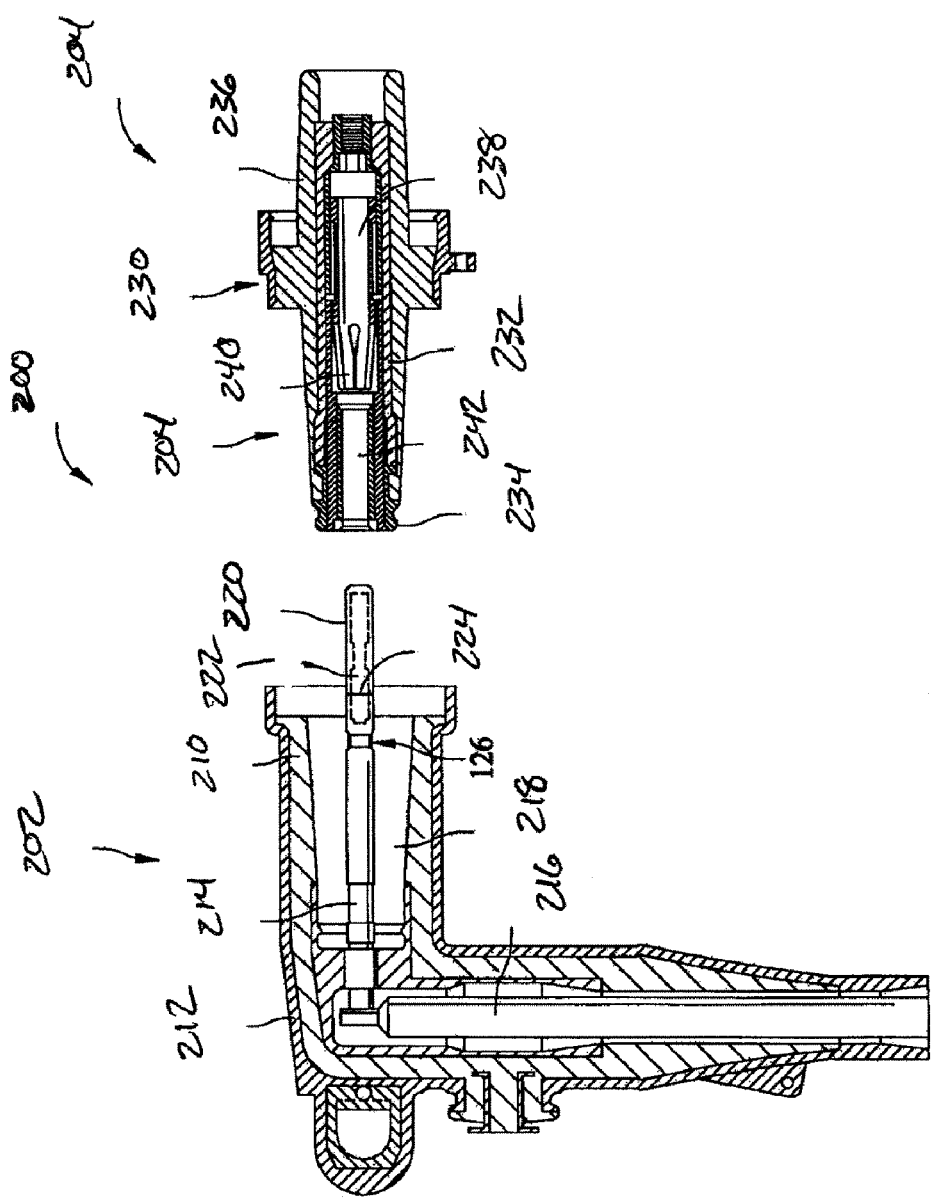
FIG. 4 is a longitudinal cross-sectional view of a known separable loadbreak connector system.

FIG. 4 is a longitudinal cross-sectional view of a conventional separable loadbreak connector system 200 that may be utilized to connect and disconnect cables to the switchgear 100 under energized circuit conditions at rated voltage and under electrical load current conditions.

As shown in FIG. 4, the loadbreak connector system 200 includes a male connector 202 and a female connector 204. The female connector 204 may be, for example, a bushing insert or connector connected to the switchgear 100, for example, or another electrical apparatus such as a capacitor or transformer, and the male connector 202, may be, for example, an elbow connector, electrically connected to a respective one of the cables 112 (FIGS. 1 and 3). The male and female connectors 202, 204 respectively engage and disengage one another to achieve electrical connection or disconnection to and from the switchgear 100 or other electrical apparatus.

While the male connector 202 is illustrated as an elbow connector in FIG. 4, and while the female connector 204 is illustrated as a bushing insert, the male and female connectors may be of other types and configurations known in the art.

In an exemplary embodiment, and as shown in FIG. 4, the male connector 202 may include an elastomeric housing 210 of a material such as EPDM (ethylene-propylene-dienemonomer) rubber which is provided on its outer surface with a conductive shield layer 212 which is connected to electrical ground. One end of a male contact element or probe 214, of a material such as copper, extends from a conductor contact 216 within the housing 210 into a cup shaped recess 218 of the housing 210. An arc follower 220 of ablative material, such as acetal co-polymer resin loaded with finely divided melamine in one example, extends from an opposite end of the male contact element 214. The ablative material may be injection molded on an epoxy bonded glass fiber reinforcing pin 222. A recess 224 is provided at the junction between metal rod 214 and arc follower 220. An aperture 226 is provided through the exposed end of rod 214 for the purpose of assembly.

The female connector 204 may be a bushing insert composed of a shield assembly 230 having an elongated body including an inner rigid, metallic, electrically conductive sleeve or contact tube 232 having a non-conductive nose piece 234 secured to one end of the contact tube 232, and elastomeric insulating material 236 surrounding and bonded to the outer surface of the contact tube 232 and a portion of the nose piece 234. The female connector 204 may be electrically and mechanically mounted to a bushing well (not shown) disposed on the enclosure of the switchgear 100 or a transformer or other electrical equipment.

A contact assembly including a female contact 238 having deflectable contact fingers 240 is positioned within the contact tube 232, and an arc interrupter 242 is provided proximate the female contact 238.

The male and female connectors 202, 204 are operable or matable during "loadmake", "loadbreak", and "fault closure" conditions. Loadmake conditions occur when the one of the contact elements, such as the male contact element 214 is energized and the other of the contact elements, such as the female contact element 238 is engaged with a normal load. An arc of moderate intensity is struck between the contact elements 214, 238 as they approach one another and until joinder under loadmake conditions. Loadbreak conditions occur when the mated male and female contact elements 214, 238 are separated when energized and supplying power to a normal load. Moderate intensity arcing again occurs between the contact elements 214, 238 from the point of separation thereof until they are somewhat removed from one another. Fault closure conditions occur when the male and female contact elements 214, 238 are mated with one of the contacts being energized and the other being engaged with a load having a fault, such as a short circuit condition. Substantial arcing occurs between the contact elements 214, 238 in fault closure conditions as the contact elements approach one another they are joined. In accordance with known connectors of this type, expanding gas is employed to accelerate the female contact 238 in the direction of the male contact element 240 as the connectors 202, 204 are engaged, thus minimizing arcing time and hazardous conditions.

Figure 5:
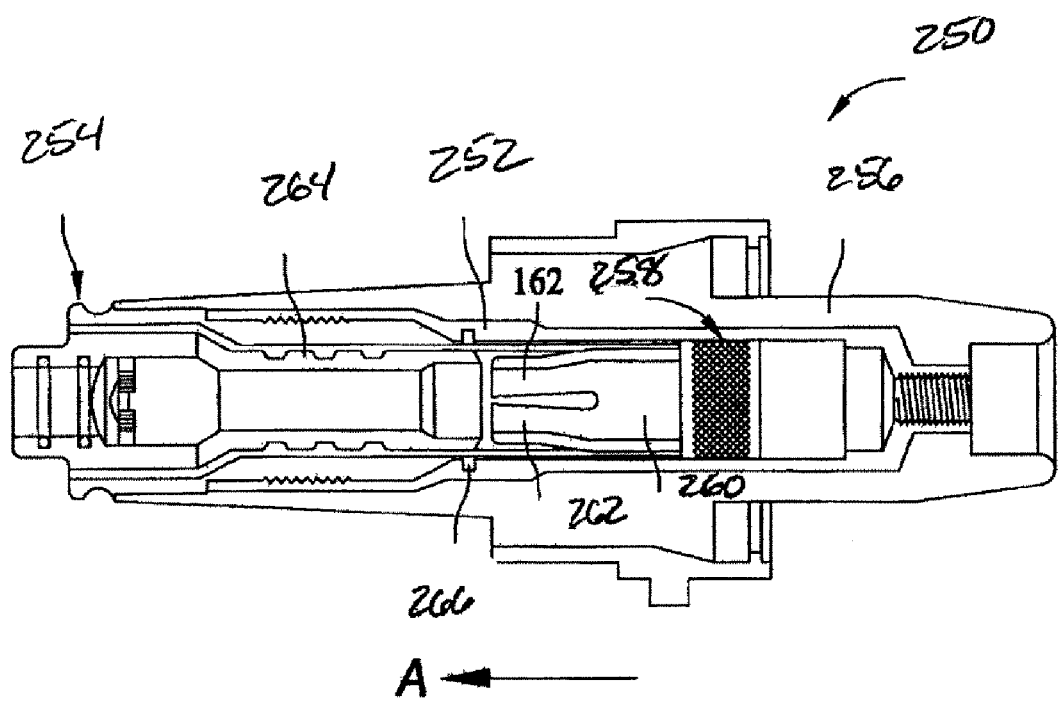
FIG. 5 is an enlarged cross-sectional view of a known female contact connector that may be used in the loadbreak connector system shown in FIG. 4.

FIG. 5 illustrates another conventional female connector 250 that may be used in the connector system 200 (FIG. 4) in lieu of the female connector 204. Like the connector 204, the female connector 250 includes an elongated body including an inner rigid, metallic, electrically conductive sleeve or contact tube 252 having a non-conductive nose piece 254 secured to one end of the contact tube 252, and elastomeric insulating material 256 surrounding and bonded to the outer surface of the contact tube 252 and a portion of the nose piece 254.

A contact assembly includes a piston 258 and a female contact element 260 having deflectable contact fingers 262 is positioned within the contact tube 252 and an arc interrupter 264 is provided proximate the female contact 260. The piston 258, the female contact element 260, and the arc interrupter 264 are movable or displaceable along a longitudinal axis of the connector 250 in the direction of arrow A toward the male contact element 214 (FIG. 4) during a fault closure condition. To prevent movement of the female contact 260 beyond a predetermined amount in the fault closure condition, a stop ring 266 is provided, typically fabricated from a hardened steel or other rigid material.

Loadbreak connector systems can be rather complicated in their construction, and are typically provided with current ratings of about 200 A or below due to practical limitations in making and breaking connections carrying load current. Also, the load break, load make and fault closure features of such connectors are of no practical concern for applications such as that described above wherein removal and replacement of fuse modules involves making and breaking of connections under energized circuit conditions at rated voltage, but not under load current conditions.

C. Conventional Deadbreak Connector Systems

Figure 6:
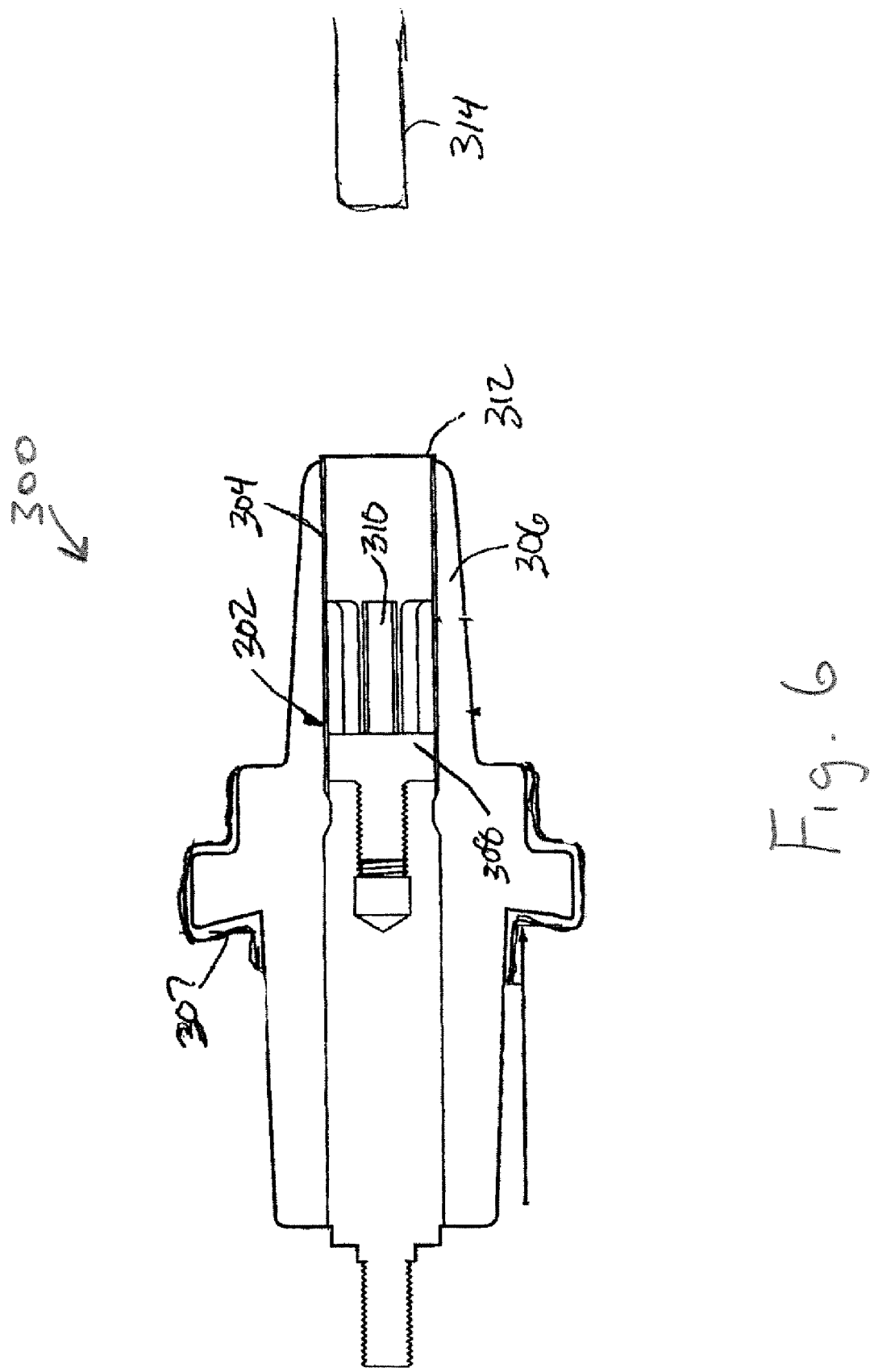
FIG. 6 is a cross sectional view of a separable deadbreak connector formed in accordance with an exemplary embodiment of the invention.

FIG. 6 is a cross sectional schematic view of an exemplary conventional female connector 300 of a deadbreak connector system. As shown in FIG. 6. the female connector 300 may be a bushing insert composed of a shield assembly 302 having an elongated body including an inner rigid, metallic, electrically conductive sleeve or contact tube 304 and elastomeric insulating material 306 surrounding and bonded to the outer surface of the contact tube 304. A conductive ground plane 307 may be provided on an outer surface of the housing 306. The female connector 300 may be electrically and mechanically mounted to the enclosure of the switchgear 100 or other electrical equipment.

A contact assembly including a female contact 308 having deflectable contact fingers 310 is positioned within the contact tube 304. Unlike the loadbreak connector system previously described, the contact 308 is fixedly secured and is not movable relative to the contact tube 304. Also as shown in FIG. 6, conductive portions of the connector 300 are generally exposed at and end 312 of the connector. In particular, the end of the contact tube 304, which in use is at the operating voltage potential of the female contact 308, is generally exposed at the end 312 of the connector 304.

Because conductive components of the connector 300 are exposed at the connector end 312, if subjected to large operating voltages in the absence of load current conditions as described above when a fuse element operates, voltage flashover may occur between the exposed conductive components and a male contact probe 314 of a mating connector as the connectors are separated or mated. Voltage flashover may also occur from the exposed conductive components at the connector end 312 to the connector ground plane 307. Such flashover may present a hazardous condition and is undesirable.

Additionally, as previously mentioned, known deadbreak connectors are typically constructed to provide current ratings of about 600 A or less. Connectors with higher ratings are desirable.

II. Separable Insulated Connector Systems

Figure 7:
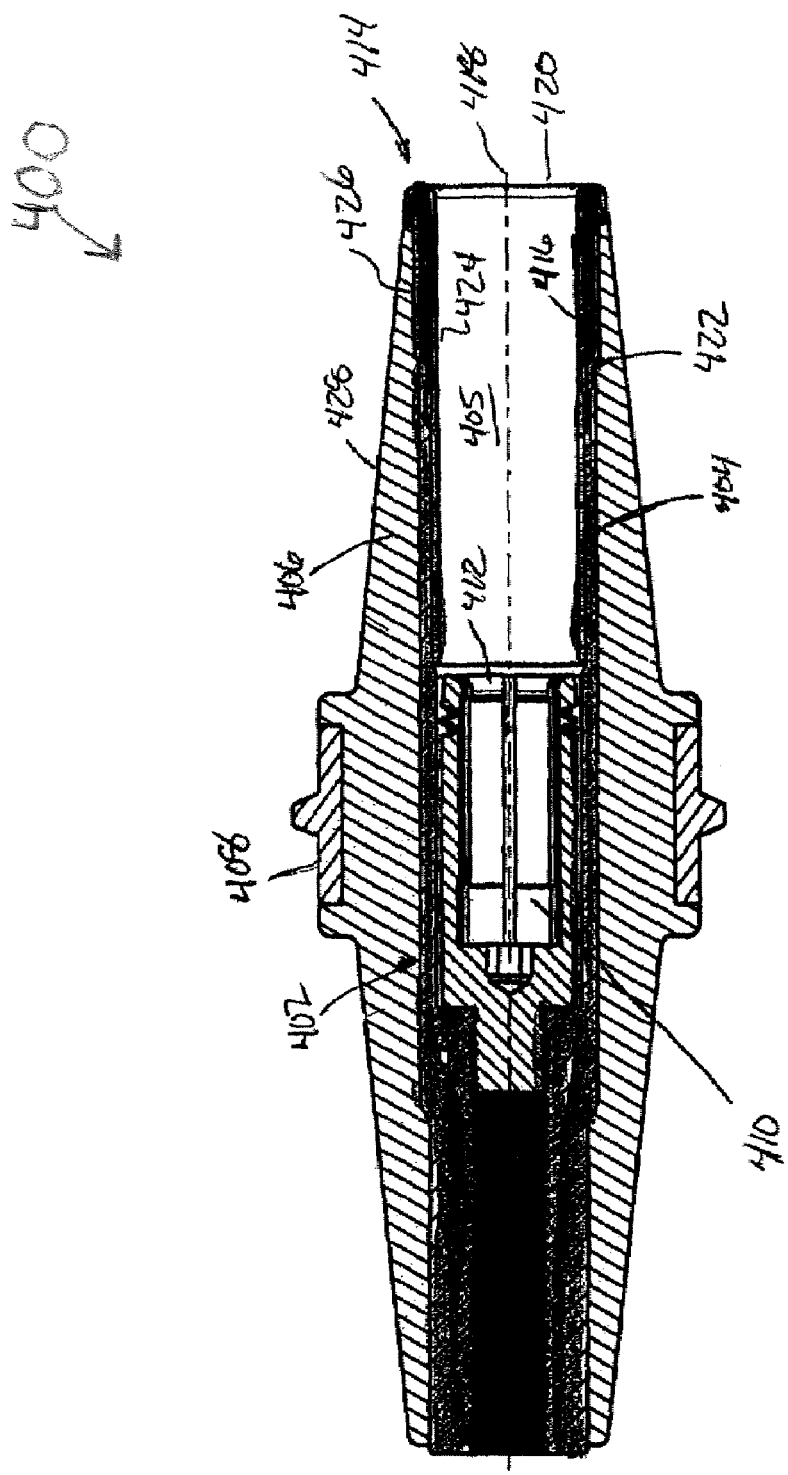
FIG. 7 is a cross sectional view of an energized break female connector formed in accordance with an exemplary embodiment of the invention.

FIG. 7 is a cross sectional view of an energized break female connector 400 formed in accordance with one exemplary embodiment that overcomes the various problems and difficulties discussed above in Part I. As used, herein, "energized break" shall refer to energized circuit conditions wherein rated voltage potential exists but load current does not exist due to, for example, a protective element such as a fuse opening a current path. It is recognized that the description and figures set forth herein are set forth for illustrative purposes only, and that the benefits may accrue to other types of electrical equipment. The illustrated embodiments of switchgear and connectors are merely exemplary configurations of devices and equipment embodying the inventive concepts herein.

Likewise, while the energized break connector 400 is described and depicted herein having a particular configuration with certain attributes, materials, shape and dimension, it is understood that various embodiments having other, materials, shape and dimension may likewise be constructed within the scope and spirit of the invention.

As shown in FIG. 7, the female connector 400 may be a bushing insert having of a shield assembly 402 formed with an elongated body including an inner rigid, metallic, electrically conductive sleeve or contact tube 404 defining an axial passage 405, and elastomeric insulating material 406 (also termed the "housing") forming a housing surrounding and bonded to the outer surface of the contact tube 404. While the connector is illustrated with a particular shape of contact tube 404 and housing 406, other shapes of these components may also be utilized as desired.

A conductive ground plane 408 may be provided on an outer surface of the housing 406 for safety reasons. The female connector 400 may be electrically and mechanically mounted to a bushing well (not shown) disposed on the enclosure of the switchgear 100 or other electrical equipment. Alternatively, the female connector 400 may be utilized for other purposes.

A contact assembly including a female contact 410 having deflectable contact fingers 412 is positioned within the contact tube 404. While a particular type and shape of contact 410 is illustrated, it is recognized that other types of contacts may be utilized.

Like the deadbreak connector system 300 (FIG. 6) previously described, the contact 410 is fixedly secured and is not movable relative to the contact tube 404 in any operating condition, in specific contrast to the loadbreak connector 204 and 250 (FIGS. 4 and 5) having a movable contact assembly during fault closure conditions. Unlike either of the loadbreak and deadbreak connectors previously described, the energized break connector 400 includes a continuous, uninterrupted, bonded insulation system 414 extending from the contact fingers 412 to the ground plane 408 on the outer surface of the housing 406.

The insulation system 414 includes a nonconductive nosepiece 416 and a portion of the housing 406 as described below. The nosepiece 416 extends substantially an entire distance along an axis 418 of the connector from the contact fingers 412 to a distal open end 420 of the connector that receives a male contact probe of a mating connector (not shown in FIG. 7). The nosepiece 416 may be fabricated from a nonconductive material such as nylon in an exemplary embodiment, although other materials may likewise be used to form the nosepiece 416.

In one embodiment, the nosepiece 416 may mechanically engage the contact tube 404 with snap fit engagement. In another embodiment, threads and other fasteners, including adhesives and the like, may be utilized to attach to the nosepiece 414 to the contact tube 404 and/or another component of the connector 400. In still another embodiment, the nosepiece 416 may be molded into the connector construction if desired.

In one exemplary embodiment, the nosepiece 416 may be shaped or otherwise formed into a substantially cylindrical body that overlaps an substantially covers an interior surface of the contact tube 404 for an axial distance along the axis 418 from a point proximate or adjacent to the contact fingers 412 to a distal end 422 of the contact tube 404, and also extends an axial distance from contact tube end 422 to the distal open end 420 of the connector. The elastomeric housing 406 also extends well beyond the distal end 422 of the contact tube 404 and overlies an exterior surface of a portion of the nosepiece 416 extending forwardly of the distal end 422 of the contact tube.

An inner surface 424 of the nosepiece may be generally smooth and constant in dimension, and defines a continuously insulated path from the end of the contact fingers 412 along the passage 405 of the contact tube 404 to the distal end 420 of the connector 400. An exterior surface 426 of the nosepiece may be irregular in shape, and may include a first portion of a relatively larger outer diameter that meets a portion of the housing 406 adjacent the distal end 420, and a portion of relatively smaller outer diameter that is received within the contact tube 404 and provides an insulative barrier on the inner surface of the contact tube 404.

While an exemplary shape of the nosepiece 416 has been described having portions of different diameters and the like, it is recognized that the nosepiece may be alternatively shaped and formed in other embodiments, while still achieving the same benefits.

The extension of the nosepiece 416 and the housing 406 beyond the distal end 422 of the contact tube 404 effectively spaces the female contact 410, and particularly the contact fingers 412, farther from the distal end 420 of the connector 400. In other words, the extension of the nosepiece 416 and the housing 406 results in the female contact being further recessed in the contact tube 404 relative to the end 420 of the connector. This accordingly mitigates flashover between the contact fingers 412 and the distal end 420 of the connector 400 when the female connector 400 is engaged to or separated from a male contact probe of a mating connector, which may be the male connector of a fuse module in the electrical equipment. The non-conductive nosepiece 416 and the extended housing 406 fully insulate the distal end 420 of the connector 400 such that no conductive component is exposed proximate the distal end 420. Flashover at, for example, the distal end 420 of the contact tube 404 is accordingly avoided.

Extension of the housing 406 to meet the extended nosepiece 416 at a distance from the end 422 of the contact tube also effectively increases a path length on the outer surface of the connector interface 428 between the connector distal end 420 and the ground plane. The increased path length along the inner surface 424 of the nosepiece 416 and the increased path length on the outer surface of the interface 428 of the housing 406 is believed to substantially reduce, if not altogether eliminate, instances of flashover between the contact fingers 412 and the ground plane 408. The longer interface creep distance also yields better static dielectric performance of the connector 400.

As is also clear from FIG. 7, the nosepiece 416 and/or the elastomeric housing 406 are devoid of any venting features and the like that are common to loadbreak connector systems for releasing arc quenching gases and the like. That is, no air gaps or passages for gas are formed into the energized break connector construction, and instead the insulative nosepiece 416 and the elastomeric housing 416 are uniformly constructed in a solid manner without discontinuities, openings, gaps or spaces formed therein and therebetween that may otherwise present voltage tracking and flashover concerns.

By virtue of the above-described construction, the connector 400 may enjoy current ratings up to, for example, 900 A in an economical and easy to manufacture platform. The energized break separable connector 400 is matable to and separable from a mating connector with rated voltage between the connector contacts but without load current, and may effectively allow replacement of fuse element modules in electrical equipment while the equipment remains in service and with minimal disruption to a power distribution system.

Figure 8:
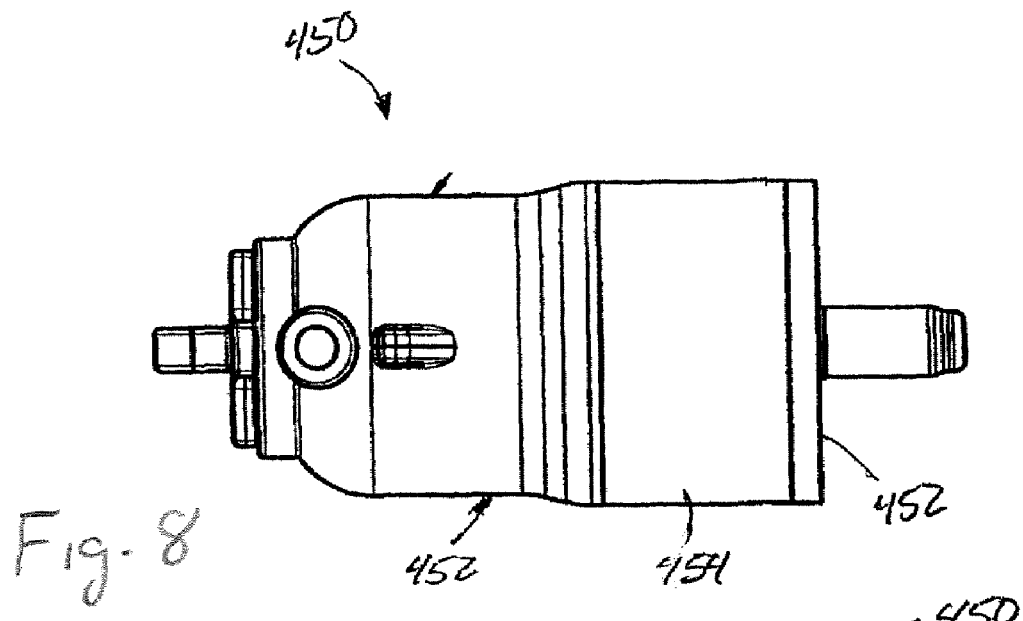
FIG. 8 is a top view of an exemplary mating connector for the male connector shown in FIG. 7.
Figure 9:
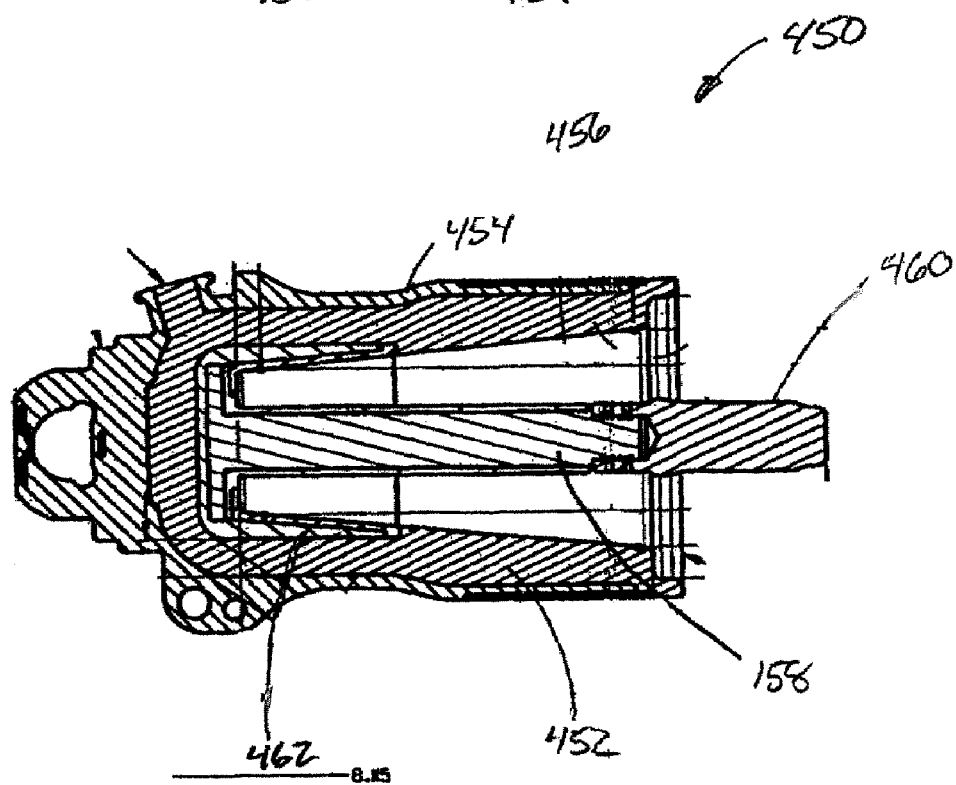
FIG. 9 is a vertical cross sectional view of the connector shown in FIG. 8.

FIGS. 8 and 9 are a top view, and a cross sectional view of a male connector 450 that may be utilized with the energized break connector 400 of FIG. 7. The male connector 450 includes an elastomeric housing 452 and a ground plane 454 provided on the housing 452. The housing 452 defines a connector interface 456, and a contact assembly including a contact probe 458 is situated within the housing 452 and extends along a passage defined by the interface 456. A conductive extension member 460 may be coupled to an end of the contact probe 458 and may project outwardly and away from the interface 456 for a specified distance. The length of the extension member 460 accommodates the extended nosepiece 416 and housing 406 (FIG. 7) of the connector 400 and ensures that sufficient mechanical and electrical contact is made between the contact 410 (FIG. 7) and the contact extension 460 of the male connector 450.

When the connector 450 is mated with the connector 400 (FIG. 7), the interface 428 of the connector 400 is received within the interface 456 of the connector 450, and the male contact probe 458 and contact extension 460 are extended through the open end 420 of the connector 400 until the contact extension 460 is in mechanical and electrical engagement with the contact fingers 412.

The connector 450 may also include a semiconductive insert such as a faraday cage 462, which has the same electric potential as the contact probe 458. The faraday cage 462 prevents corona discharges within interface 456 when the connector 452 is mated, for example, to the female connector 400 (FIG. 7).

Figure 10:
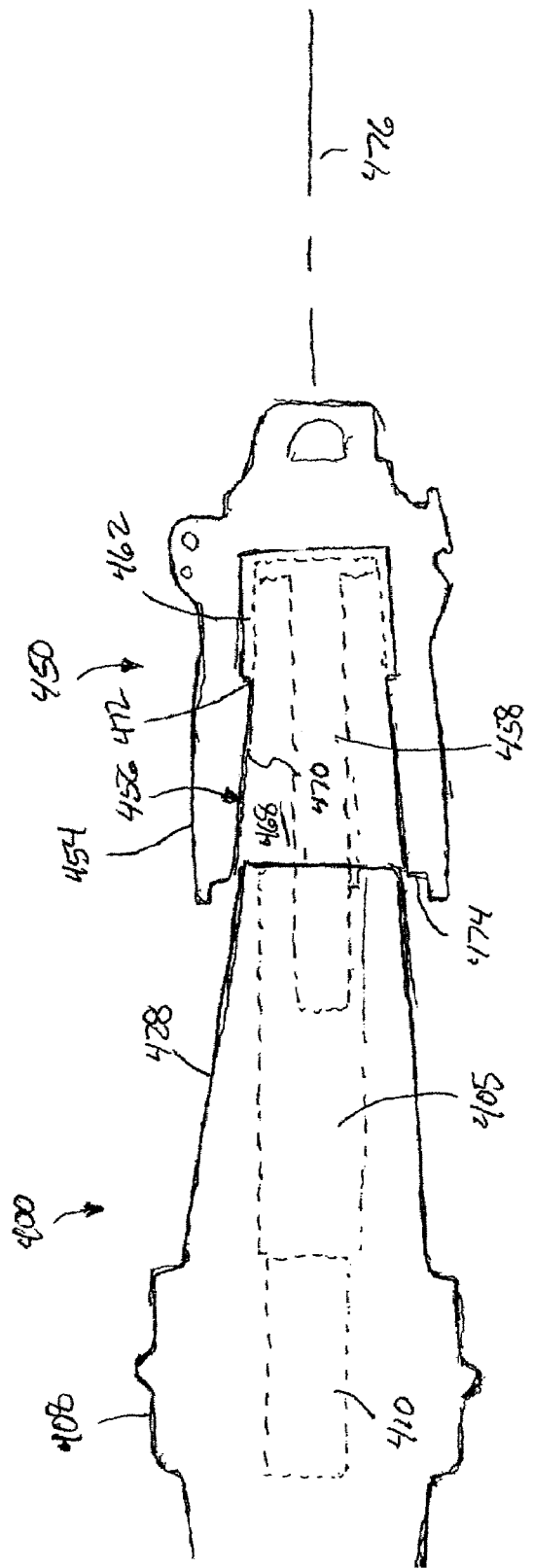
FIG. 10 schematically illustrates a first connector interface for the connectors shown in FIGS. 7 and 9.

The male connector 450 may be configured as an elbow connector that engages the female connector 400 via the interface 456 on one end, and engages, for example, a fuse element module on another end (not shown in FIGS. 9 and 10). Alternatively, the connector 450 may be configured into a another type of connector having any shape or configuration desired. The connector 450 may also be configured as a protective cap for use with the female connector 400 that is energized at rated voltage as described above.

FIG. 10 schematically illustrates a first connector interface for the connectors 400 and 450 shown in FIGS. 7 and 9, respectively, illustrating the connectors 400 being mated to one another.

The female connector interface 428 may be generally conical in shape in one embodiment, and may have a tapered outer surface 428 of a generally decreasing diameter from left to right as depicted in FIG. 10. The female connector interface 428 may be generally smooth and continuous such that the outer diameter along the interface 428 decreases at a generally constant rate along the axis of the female connector 400.

The male connector interface 456 forms a recess, cavity or passage 468 that receives the female connector interface 428, and as such may be complementary in shape and profile. As such, in the exemplary embodiment of FIG. 10 the male connector interface 456 may also be generally conical in shape or form, and accordingly has a tapered inner surface 470 of a generally decreasing diameter from left to right as depicted in FIG. 10. The male connector interface 456 may be generally smooth and continuous such that the outer diameter along the interface 456 decreases at a generally constant rate along the axis of the male connector 450. The conductive insert defining the faraday cage 462 around a portion of the contact probe 458 abuts one end 472 of the male connector 456, and the interface 456 extends between the faraday cage 462 and a mouth or rim 474 at the end of the connector 450.

When the axis of each connector 400 and 450 is aligned, the connectors 400 and 450 are movable toward one another along an insertion axis 476 to a fully engaged position wherein the female connector interface 428 is fully received in the male connector interface 456. When so engaged, the contact probe 458 is extended through the passage 405 of the connector 400 and into mechanical and electrical contact with the female contact element 410.

As the connectors are mated, the outer surface of the female connector interface 428 and the inner surface 470 of the female connector interface 450 are generally parallel to one another such that the female connector interface 428 is self-aligning within the male connector interface 456. The continuous and generally parallel interfaces 428 and 456 are sometimes referred to as a straight-line interface. The female connector interface 428 is slidably received in the interface 456 of the connector 462 with generally complete surface-to-surface engagement between the outer surface of the interface 428 and the inner surface 470 of the interface 456. Because the mating interfaces 428 and 456 are each formed with elastomeric insulation, and because the outer dimensions of the interface 428 are selected to provide a slight interference fit within the interface 456, some difficulty may result in sliding the connectors 400 and 450 together to mate them or to separate them.

To reduce the amount of force needed to mate or separate the connectors 400 and 450, in operation, silicon grease, silicon oil, or other lubricants known in the art are applied between the female connector interface 428 and the interface 456 of the connector 462. However, because of the need for an interference fit the connector 450 is constantly squeezing down upon the connector 400 in order to keep water and other elements out and keep in electrons. Because the connectors are conical, the constant squeezing also can extrude the silicon grease off of the interfaces 428 and 456. Over time, the grease migrates down the interface. Once some of the grease has migrated, it becomes more difficult to separate the connectors 400 and 450.

It is believed that the conductive insert forming the faraday cage 462, that is subject to the same operating voltage potential as the contact probe 458 in use, presents a somewhat increased likelihood of voltage tracking along the male connector interface 456, and presents opportunity for potential flashover from the male connector interface 456 to the ground plane 454 of the male connector 450.

Figure 11:
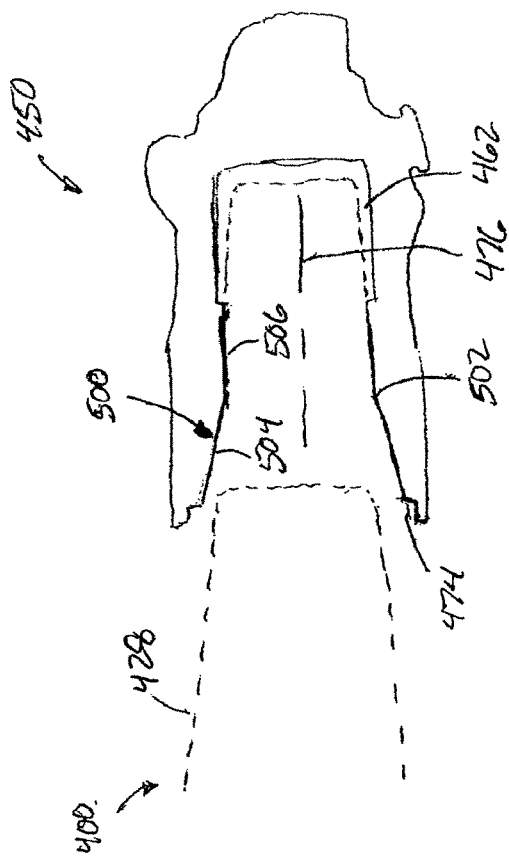

FIGS. 11 and 12 schematically illustrates an alternative connector interface that may be utilized in the connectors 400 and 450 shown in FIGS. 7 and 9 that may be less susceptible to voltage tracking and potential flashover. Like reference characters of the previous figures are therefore used to indicate like features in FIG. 11.

Unlike the straight line male connector interface 456 previously described above in relation to FIG. 10, the connector 450 may include an interface 500 having an inflection 502 that presents a deviation from the straight line interface and the parallel alignment of the female connector interface 428 and the male connector interface 500 along the insertion axis 476 as the connectors are mated. In one exemplary embodiment, the types of inflections described herein with regard to the current invention may be positioned from and end of the conductive insert to the start of the shoulder radius for the exemplary connectors.

In the exemplary embodiment of FIGS. 11 and 12, the inflection 502 presents a discontinuity in the male connector interface 500, such that the interface 500 has two distinct portions 504 and 506. One portion 504 extends prior to or before the inflection 502 as the connectors are mated, and the other portion 506 extends subsequent to or after the inflection 502 as the connectors are mated. The portion 504 before the inflection 502 may have, as shown in FIGS. 11 and 12, a steeper angle of inclination relative to the insertion axis 476 than the portion 506. That is, the portion 504 may present a wider opening near the mouth 474 of the connector 450, and may decrease in inner surface dimension at greater rate than the portion 506 along the insertion axis.

The differing rate of change in inner surface diameter of the interface 500 in the portions 504 and 506 allows, for example, the portion 504 to present a wider opening to receive the female connector interface without surface-to-surface engagement of the interface portion 504 and the female connector interface 428. As such the resistance of the connectors to being mated may be reduced because the surface-to-surface engagement of the connector interfaces occurs only along a portion of their interface lengths, as opposed to the entire length.

Moreover, the interface portion 506, which does fully engage the female connector interface 428 with surface-to-surface engagement, may be dimensioned to provide a tighter interference fit with the female connector interface 428 than for example the embodiment shown in FIG. 10. Notably, however, because the interface portion 506 engages the female connector interface for only part of its length, the connectors 400 and 450 may be mated with less operating force than if the straight-line interface of FIG. 10 were utilized. When the inflection is used to generate additional contact pressure between the interface portion 506 and the female connector interface 428 in such a manner, voltage tracking along the interface 500 is believed to be less likely in comparison to the straight line interface of FIG. 10. An increased band of compression in the area of the inflection 502 has been found to prevent voltage tracking and associated failure conditions.

FIG. 22 provides exemplary test results comparing the failure rate for voltage tracking conditions for the embodiment described in FIG. 10 as compared to the embodiment described in FIGS. 11 and 12. The test results for the embodiment of FIG. 10 are provided in the top two tables, while the test results for the embodiment described in FIGS. 11 and 12 are provided in the bottom two tables. With regards to the embodiment of FIG. 10, two of the samples failed at 70 kV while 3 other samples failed at 80 kV. However, with regards to the embodiment of FIGS. 11 and 12, it can be seen from the bottom tables of FIG. 22 that none of the samples having the dual taper failed.

As shown in the test data of FIG. 22, the inflection 502 and its increased compression is also believed to improve dielectric performance of the connector system. In one example, the connector system may capably withstand voltages of 80 kV AC and impulses of 200 BIL (Basic Impulse Level). The improved dielectric performance of the connector system based on the test results was unexpected.

Figure 13:
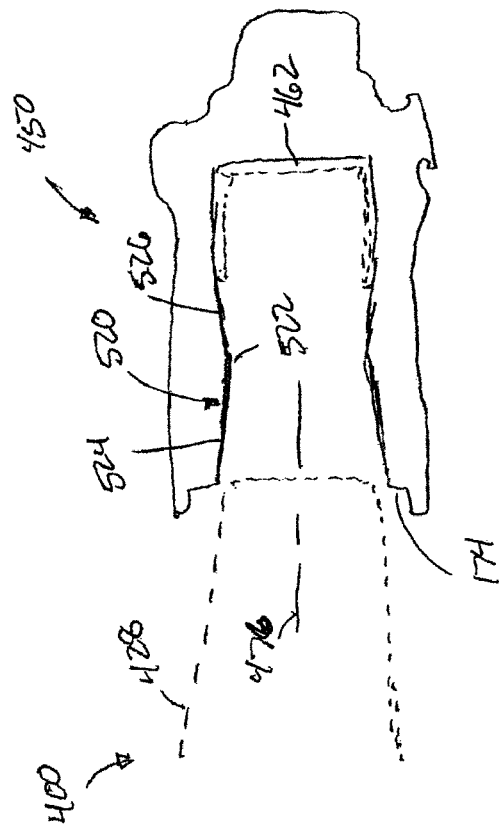
FIGS. 13 and 14 illustrate an exemplary embodiment of another alternative for a connector interface for the connectors shown in FIGS. 7 and 9.
Figure 14:
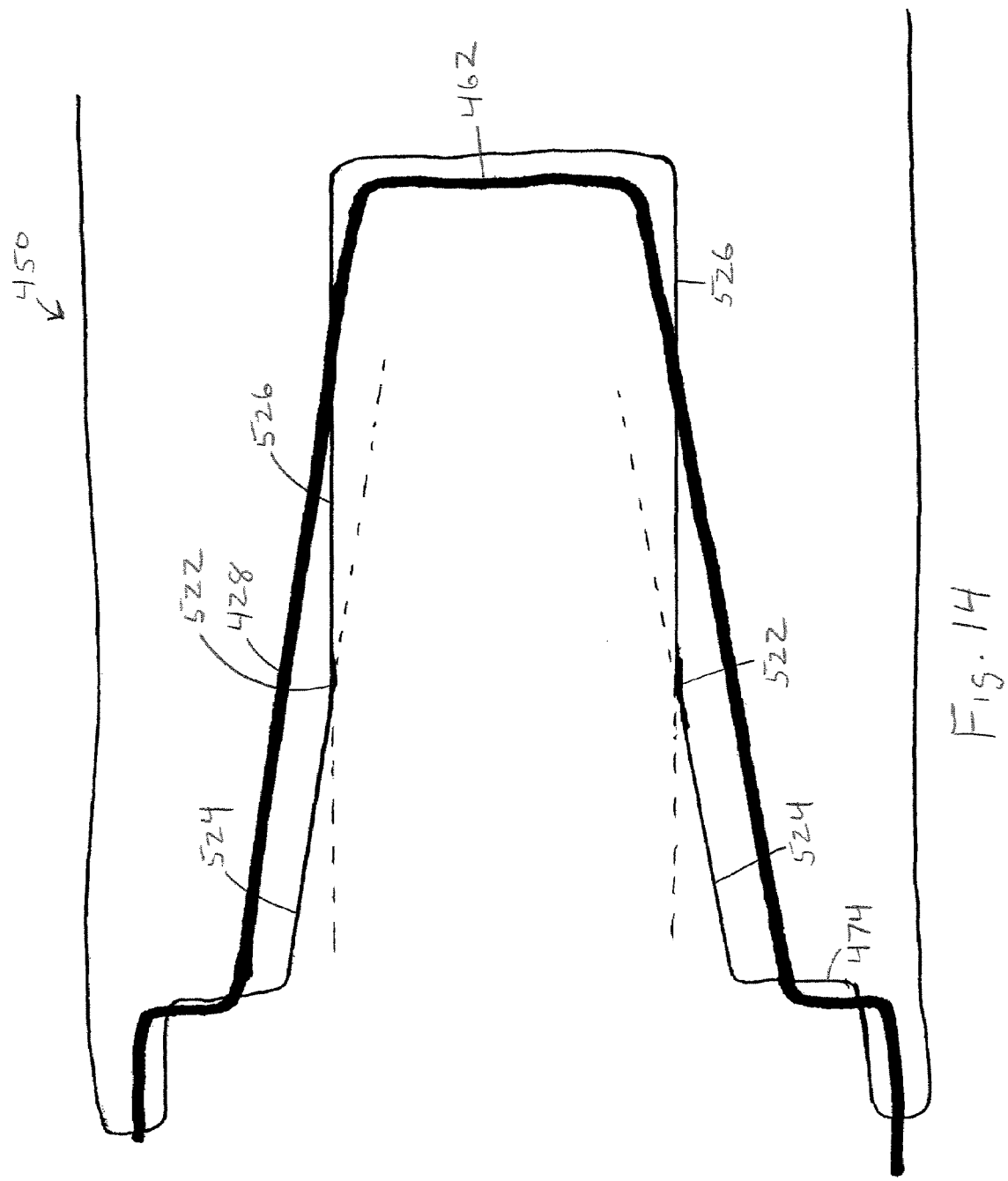

FIGS. 13 and 14 illustrate another embodiment of a connector interface wherein the male connector 450 is provided with a connector interface 520 that is essentially the inverse of the interface 500 shown in FIGS. 11 and 12, but providing similar benefits.

The interface 520 includes an inflection 522 that presents a deviation from the straight line interface and the parallel alignment of the female connector interface 428 and the male connector interface 520 along the insertion axis 476 as the connectors are mated. The inflection 522 presents a discontinuity in the male connector interface 520, such that the interface 520 has two distinct portions 524 and 526. One portion 524 extends prior to or before the inflection 522 as the connectors are mated, and the other portion 526 extends subsequent to or after the inflection 522 as the connectors are mated.

The portion 524 before the inflection 522 may have, as shown in FIGS. 13 and 14, a lesser angle of inclination relative to the insertion axis 476 than the portion 526. That is, the portion 524 may present a narrower opening, as opposed to the embodiment of FIGS. 11 and 12, near the mouth 474 of the connector 450, and may decrease in inner surface dimension at a constant rate along the insertion axis. The interface portion 526 after the inflection 522 however, increases in inner surface dimension. The different rate of change inner surface dimension of the interface 520 before and after the inflection 522, one being negative the other being positive, is advantageous for the reasons set forth below.

Moreover, the interface portion 524 prior to the inflection 522, may be dimensioned to provide a tighter interference fit with the female connector interface 428 than for example the embodiment shown in FIG. 10. When the inflection 522 is used to generate additional contact pressure between the interface portion 524 and the female connector interface 428 in such a manner, voltage tracking along the interface 520 is believed to be less likely in comparison to the straight line interface of FIG. 10. An increased band of compression in the area of the inflection 502 is believed to prevent voltage tracking and associated failure conditions, and is also believed to improve dielectric performance over the embodiment of FIG. 10 similar to the results for the embodiment of FIGS. 11 and 12 presented in FIG. 22.

Figure 16:
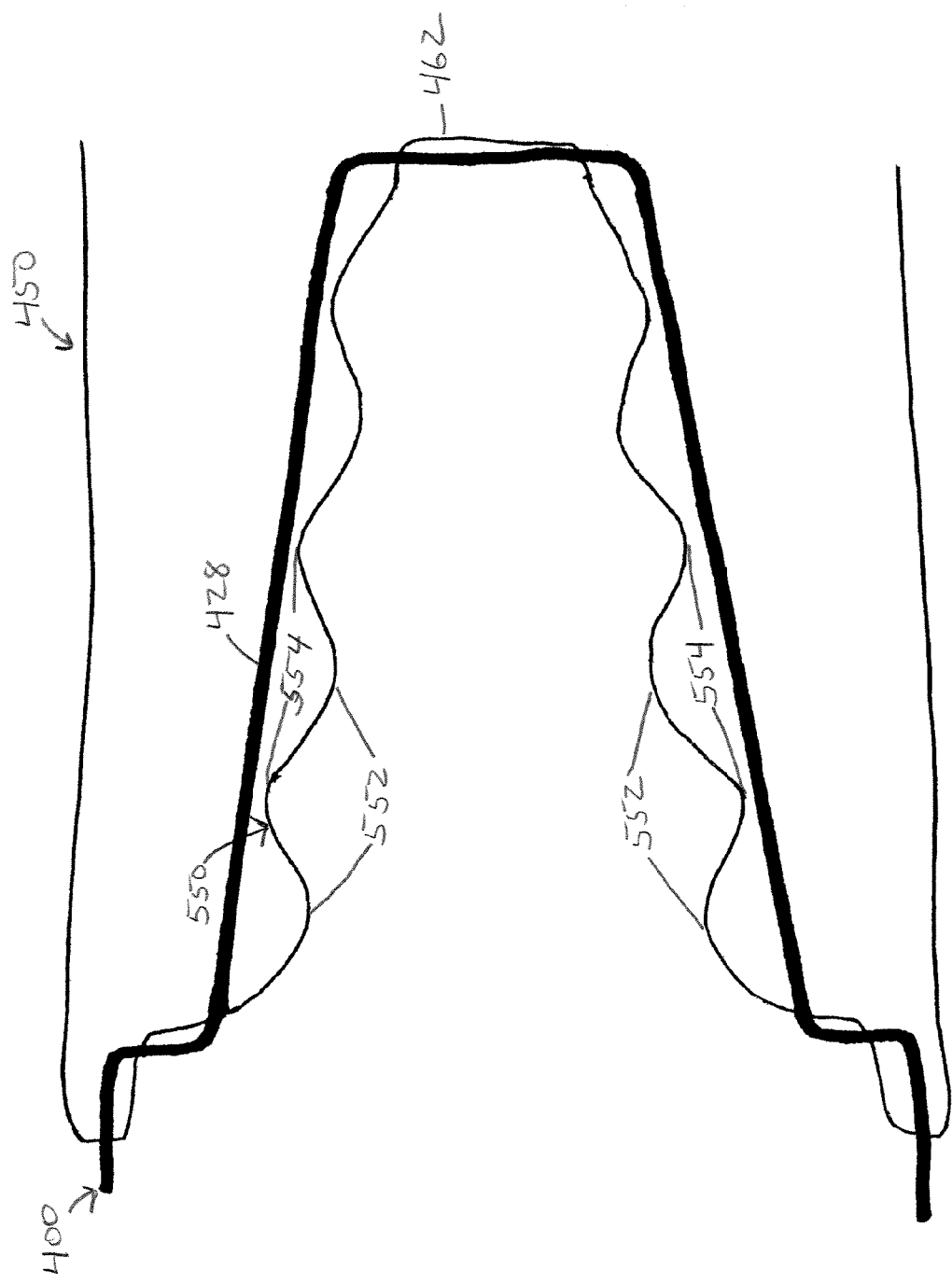

FIGS. 15 and 16 illustrate another embodiment of a connector interface for the connectors 400 and 450 wherein the male connector 450 is provided with a connector interface 550 having a profile of a waveform with smoothly rounded inflections 552 projecting inwardly toward the insertion axis 476 and generating increased contact pressure between the male connector interface 550 and the female connector interface 428 in the area of the inflections 552. In an alternative embodiment of the connector interface of FIGS. 15 and 16, the inflections 552 may be squared off or provided with another geometry known to those of skill in the art. Multiple inflections 552 may reduce voltage tracking more effectively than the embodiments shown in FIGS. 11-14. While FIGS. 15 and 16 only show a couple of inflections 552, in one exemplary embodiment, the connector interface 550 could include hundreds of inflections; however those of ordinary skill in the art will recognize that the number of inflections 552 could range from one to an infinite number of inflections 552 based on the side of the connector interface and the needs of the user.

Additionally, the waveform profile of the male connector interface 550 results in contraction of the inner surface diameter of the interface 550 on one side of the inflections 552 and expansion of the inner surface diameter of the interface on the other side of the inflections 552. As such, the different rates of change in the inner surface diameter before and after each inflection 552, one being positive and the other being negative, provides for valleys 554 between the inflections 552. The valleys provide areas of reduced interference fit wherein that the interface 550 does not engage the surface of the female connector interface 428 as tightly in the vicinity of the valleys 554. Therefore, like the embodiments of FIGS. 11-14, the embodiment of FIGS. 15-16 provides for high pressure surface-to-surface engagement of the female connector interface 428 and the male connector interface 550 only along a portion of the interface lengths. The partial pressure surface-to-surface engagement may beneficially reduce an operating force required to mate the connectors 400 and 450. Voltage tracking may also be beneficially reduced, and dielectric performance of the connector system may be increased.

In addition, the waveform profile of the male connector interface provides areas, or pockets, where the grease used to mate and separate the connectors 400 and 450 can become trapped. Because the grease is not being forced along the interface, the grease has a more difficult time migrating off the interface. Furthermore, the trapping of the grease in the pockets helps to keep the grease on the interfaces, making the connectors 400 and 450 easier to separate.

FIGS. 17 and 18 illustrate still another embodiment of a connector interface for the connectors 400 and 450 wherein the male connector 450 is provided with a connector interface 570 having an inflection 572 and a generally linear portion 570 before the inflection 572 and a curvilinear portion 576 after the inflection 572. The portion 574 may provide surface-to-surface engagement with the connector interface 428 with greater or equal contact pressure than the embodiment of FIG. 10, for example. The curvilinear portion 576 may be concave and provide an area of less interference between the female connector interface 400 such that reduced hoop stress occurs between the interface portion 576 and the female connector interface 428.

The different rate of change of inner surface dimension in the interface 470 before and after the inflection 572, provides for similar benefits to the above-described embodiments. Tight surface-to-surface engagement of the female connector interface 428 and the male connector interface 570 only along a portion of the interface lengths beneficially reduces an operating force required to mate the connectors 400 and 450, while an increased compression force in the interface portion 504 effectively prevents voltage tracking and offers improved dielectric performance.

In addition, the curvilinear portion of the male connector interface provides an area, or pocket, where the grease used to mate and separate the connectors 400 and 450 can become trapped. Because the grease is not being forced along the interface, the grease has a more difficult time migrating off the interface. Furthermore, the trapping of the grease in the pocket helps to keep the grease on the interface, making the connectors 400 and 450 easier to separate.

In addition, the larger volume of air trapped on the interface during connector insertion is more likely to "burp" the air out of the interface leading to improved dielectric performance.

FIG. 19 illustrates another embodiment of a connector interface for the connectors 400 and 450, wherein the male connector 450 is provided with a connector interface 580 having multiple inflections 582 that criss-cross one another at or substantially near right angles, generating a waffle pattern. Each inflection 582 may provide surface-to-surface engagement with the connector interface 428 with the same or greater contact pressure than the embodiment of FIG. 10. The areas 584 between the inflections 582 may be recessed from the level of the inflection so as to put less contact pressure on the connector interface. The recessed areas 584 may be flat, concave, convex, or another geometry known to those of skill in the art.

Figure 20:
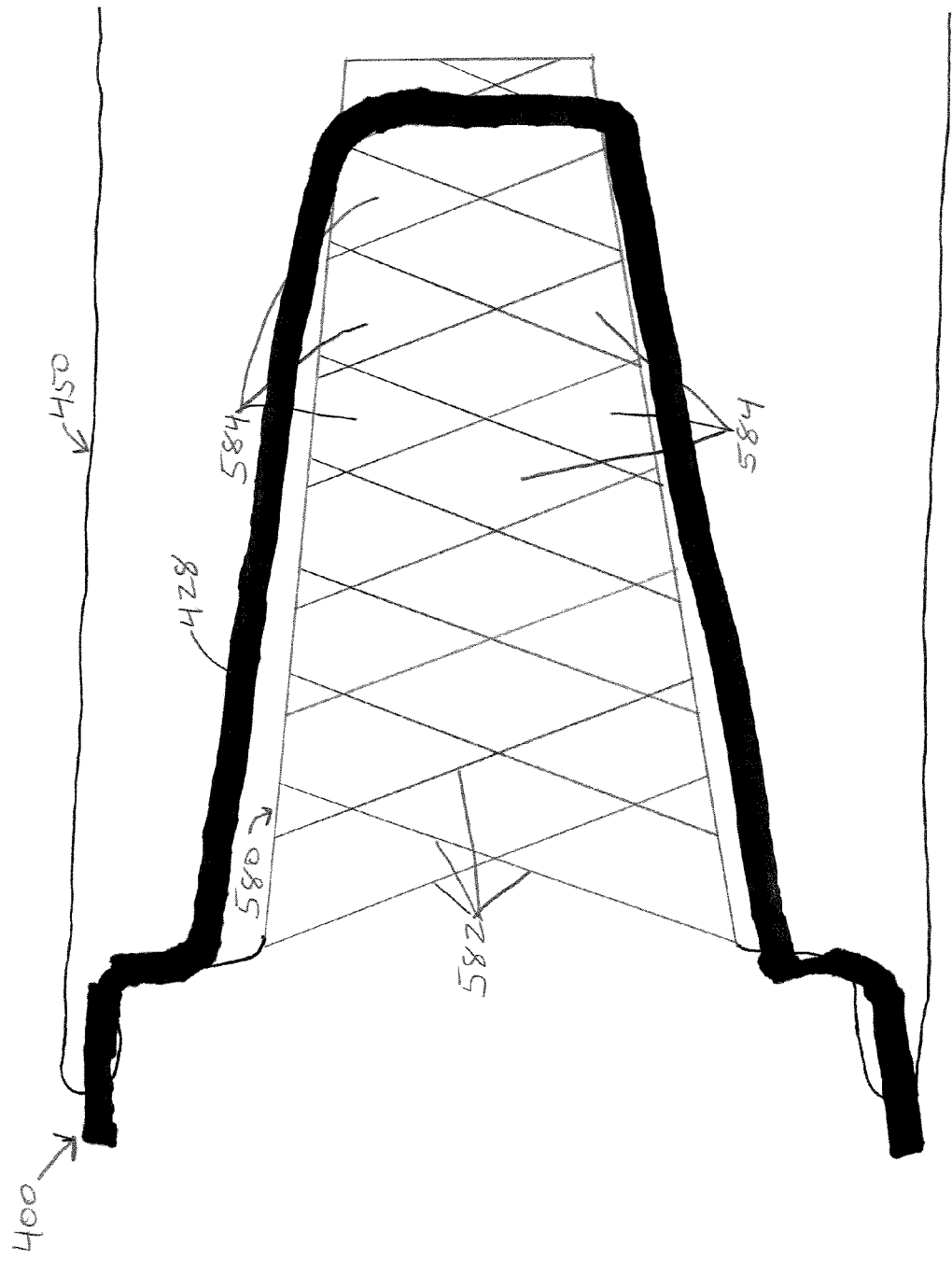
FIG. 20 illustrates a side view of an alternative exemplary connector interface embodiment having a geometric pattern for use with the connectors shown in FIGS. 7 and 9.

The multiple changes in surface dimension in the interface 580 at and around the inflections 582 may provide similar benefits to the embodiments described in FIGS. 11-15. Reduced compression engagement of the female connector interface 428 along a portion of the interface surface area beneficially reduces the operating force required to mate and separate the connectors 400 and 450, while the increased compression force at the inflections 582 effectively prevents or reduces voltage tracking and offers improved dielectric performance. Those of ordinary skill in the art will recognize that modifications to the geometric design of the connector interface 580, such as the "diamond shape" of FIG. 20 may be made while accomplishing the same benefits as the waffle design, including, but not limited to, circular, triangular, rectangular, hexagonal, octagonal and other shaped versions of the inflections 582 shown in FIGS. 19 and 20.

In addition, the recessed areas 584 of the male connector interface 580 provide an area, or pocket, where the grease used to mate and separate the connectors 400 and 450 can become trapped. Because the grease is not being forced along the interface, the grease has a more difficult time migrating off the interface. Furthermore, trapping of the grease in the pocket 584 helps to keep the grease on the interface, making the connectors 400 and 450 easier to separate.

Figure 21:
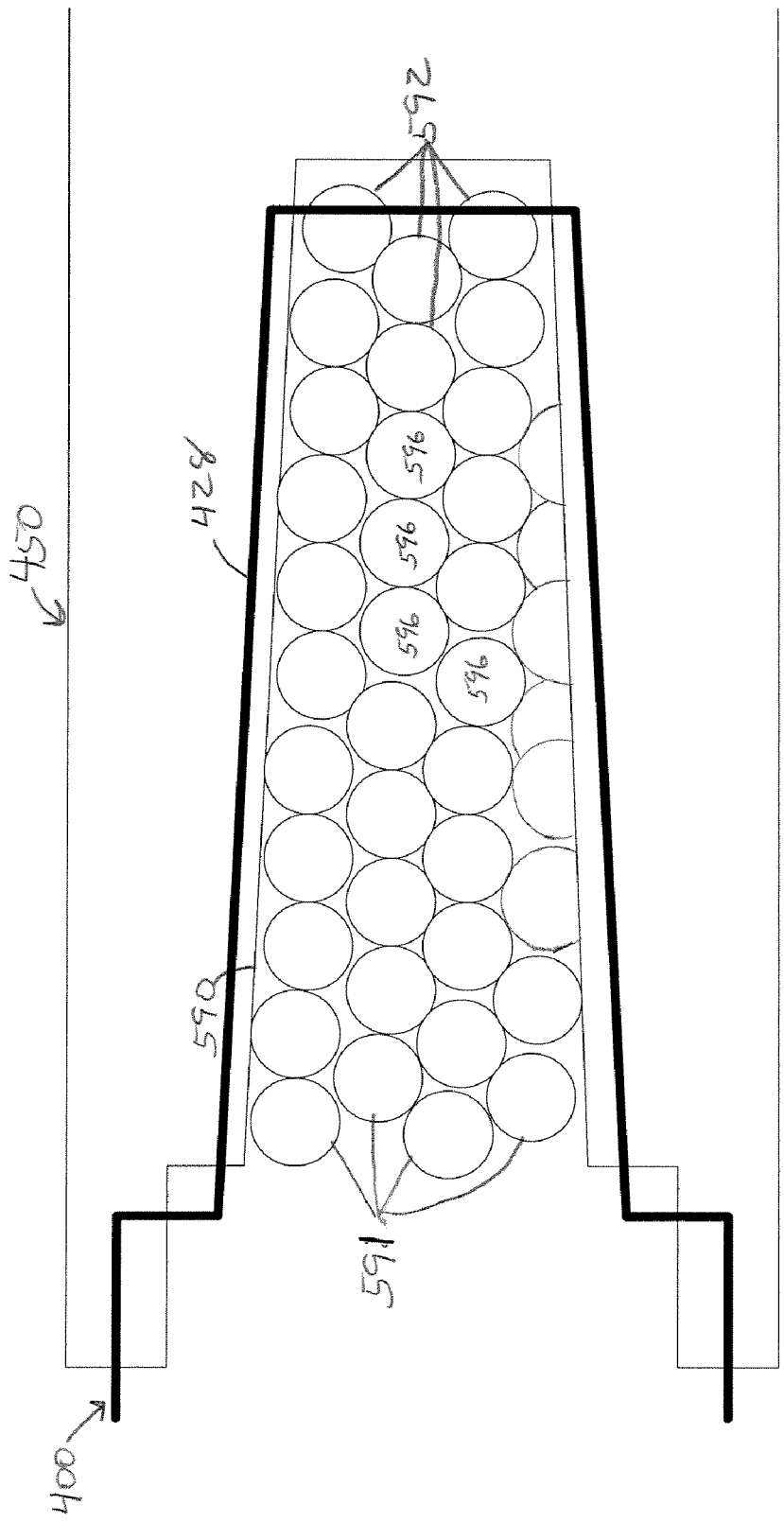
FIG. 21 illustrates a side view of an alternative exemplary connector interface embodiment having dimples for use with the connectors shown in FIGS. 7 and 9.

FIG. 21 illustrates a side view of still another embodiment of a connector interface for the connectors 400 and 450, wherein the male connector 450 is provided with a connector interface 590 having multiple spherical dimples 591, each dimple 591 having a circular inflection 592 and a recessed portion 596 inside of the inflection 592. The circular inflection 592 may provide surface-to-surface engagement with the connector interface 428 with greater or equal contact pressure than the embodiment of FIG. 10. The recessed portion 596 may be concave and provide an area of less interference fit between the female connector interface 400 such that surface-to-surface pressure is less between the recessed portion 596 and the female connector interface 428 than between the female connector interface 428 and the circular inflection 592.

The multiple changes in surface dimension in the interface at and around the inflections 592 and the recessed portion 596 may provide similar benefits to the embodiments described in FIGS. 11-15. The reduction in the surface-to-surface pressure of the female connector interface 428 along a portion of the interface 590 surface area beneficially reduces the operating force required to mate and separate the connectors 400 and 450, while the increased compression force at the inflections 592 effectively prevents or reduces voltage tracking and offers improved dielectric performance.

In addition, the recessed portion 596, or dimple, of the male connector interface 590 provides an area, or pocket, where the grease used to mate and separate the connectors 400 and 450 can become trapped. Because the grease is not being forced along the interface, the grease has a more difficult time migrating off the interface. Furthermore, trapping of the grease in the dimple 596 helps to keep the grease on the interface 590, making the connectors 400 and 450 easier to separate.

Having now described various embodiments of connector interfaces having one or more inflections creating bands of increased compression around the full circumference of the mated connector interfaces, it is recognized that further embodiments may be derived with straightforward modification of, and possibly combining aspects of, the embodiments illustrated in FIGS. 11-14. For example, the multiple inflections of FIG. 13 may be incorporated into the embodiments of FIGS. 10, 11 and 14 by introducing additional portions in the connector interfaces. As another example, the interface of FIG. 13 could be emulated geometrically with a saw tooth design without rounded inflections and valleys as illustrated. The illustrated embodiments are but a few examples of potential embodiments of connector interfaces.

While all the foregoing embodiments shown in FIGS. 11-15 include modified connector interfaces in the male connector 450 without changing the connector interface 428 of the female connector 400, it is understood that inflections may likewise be provided in the female connector interface 428 in lieu of the connector interface of the male connector 450 to provide similar effects and advantages if desired. In still further embodiments, inflections may be provided in both the male connector 450 and the female connector 400 in order to more completely optimize operating forces required to mate the connectors, meet specific performance requirements, or to achieve still higher connector ratings. The inventive connector interfaces may facilitate size reduction of the interfaces while achieving a desired current rating, or alternatively may be utilized to increase the voltage rating of the connector, while maintaining a given size of the interfaces. The connector interfaces may be implemented at relatively low cost using known manufacturing techniques.

Finally, while the interfaces shown in FIGS. 11-14 are described in relation to the energized break female connector 400 described in detail herein, the disclosed interfaces and their benefits may accrue equally to loadbreak and deadbreak separable connector systems as well. The inventive connector interfaces are not intended to be limited only to energized break connector systems.

In one exemplary embodiment, a separable insulated connector for a power distribution system has been described that includes an elastomeric insulating housing having an open end and a connector interface extending inward from the open end, the connector interface having an inner surface defining a passage dimensioned to slidably receive a mating connector along an axial insertion axis; wherein a circumferential dimension of the passage axis varies along the insertion axis; wherein the connector interface comprises at least one inflection extending circumferentially on the inner surface; and wherein a rate of change of the circumferential dimension is different before and after the inflection. In an exemplary embodiment, the rate of change of the circumferential dimension is greater before the inflection point than after the inflection point. In another exemplary embodiment, the rate of change of the circumferential dimension is constant before the inflection. In another exemplary embodiment, the inflection point generates an increased band of contact pressure with the mating connector. In another exemplary embodiment, the inner surface of the connector interface includes multiple inflection points. In another exemplary embodiment, the inner surface of the connector interface before the inflection point provides a clearance for the mating connector, and the inner surface after the inflection point engages the mating connector. In another exemplary embodiment, the inflection marks a discontinuity in the inner surface. In another exemplary embodiment, the rate of change of the circumferential dimension is negative before the inflection and positive after the inflection. In another exemplary embodiment, the inner surface after the inflection is concave. In another exemplary embodiment, the connector also includes an insert defining a faraday cage, the inner surface extending from an end of the faraday cage to the open end of the housing. In another exemplary embodiment, the mating connector has an elastomeric housing defining a generally conical interface, the passage dimensioned to securely retain the conical interface.

In one exemplary embodiment, a separable insulated connector for making or breaking an energized connection in a power distribution network includes a contact probe, a conductive insert defining a faraday cage around a portion of the probe, an elastomeric insulation housing surrounding the contact probe and the conductive insert, the housing defining an open ended connector interface, the connector interface extending about the probe forward of the conductive insert and having a tapered circumferential dimension along an axis of the probe; wherein the connector interface receives a mating connector; and wherein the connector interface comprises at least one inflection extending circumferentially on an inner surface thereof, the inflection altering an amount of insertion force necessary to engage the mating connector. In one exemplary embodiment, the circumferential dimension varies along the axis at a different rate before and after the inflection. In another exemplary embodiment, the rate of change of the circumferential dimension is greater before the inflection than after the inflection. In another exemplary embodiment, the rate of change of the circumferential dimension is constant before the inflection. In another exemplary embodiment, the inflection point increases contact pressure relative to another portion of the inner surface. In another exemplary embodiment, the inner surface of the connector interface includes multiple inflection points. In another exemplary embodiment, the clearance for the mating connector is provided on one side of the inflection, and the inner surface engages the mating connector at the inflection. In another exemplary embodiment, the inflection marks a discontinuity in the inner surface. In another exemplary embodiment, the rate of change of the circumferential dimension is negative before the inflection and positive after the inflection. In another exemplary embodiment, the inner surface after the inflection is concave. In another exemplary embodiment, the mating connector has an elastomeric housing defining a generally conical interface, the passage dimensioned to securely retain the conical interface. In another exemplary embodiment, the connector also includes a ground plane provided on an outer surface of the housing.

In one exemplary embodiment, a separable insulated connector system to make or break a connection in a power distribution system has been described that includes a first connector comprising a first elastomeric housing defining a first connector interface on an outer surface thereof; and a second connector comprising a second elastomeric housing defining a second connector interface on an inner surface thereof; wherein each of the first and second connector interfaces are tapered; and wherein the connector interfaces are not parallel to one another prior to connector engagement, but are parallel when the connectors are engaged. In another exemplary embodiment, the connector interfaces engage one another only partially along a length of the interfaces. In another exemplary embodiment, the first connector comprises an insulation system configured to make or break energized connections at rated voltage without instances of flashover. In another exemplary embodiment, the first connector interface is generally conical. In another exemplary embodiment, one of the first and second connector interfaces comprises at least one inflection extending circumferentially on the respective interface, wherein a circumferential dimension of the interface varies along the axis at a different rate before and after the inflection. In another exemplary embodiment, the rate of change of the circumferential dimension is greater before the inflection than after the inflection. In another exemplary embodiment, the rate of change of the circumferential dimension is constant before the inflection. In another exemplary embodiment, the inner surface includes multiple inflection points. In another exemplary embodiment, the inner surface before the inflection point provides a clearance for the mating connector, and the inner surface after the inflection point provides an interference fit with the mating connector. In another exemplary embodiment, the inflection marks a discontinuity in the inner surface. In another exemplary embodiment, the rate of change of the circumferential dimension is negative before the inflection and positive after the inflection. In another exemplary embodiment, the inner surface after the inflection is concave. In another exemplary embodiment, each of the first and second connectors further comprise a ground plane provided on an outer surface of the respective housings. In another exemplary embodiment, the inflection is provided on the second connector interface.

In one exemplary embodiment, a separable insulated connector device for a power distribution system has been described that includes an elastomeric housing comprising an interior, an exterior, and an open end the interior of the housing comprising a connector interface, wherein the connector interface extends inward from the open end along the interior, the connector interface comprising; an inner surface defining a passage dimensioned to slidably receive a mating connector along an insertion axis; an inflection extending circumferentially on the inner surface and comprising an increased band of contact pressure with the mating connector; wherein the rate of change of the circumferential dimension of the inner surface is greater along a first portion of the inner surface between the open end and the inflection than along a second portion of the inner surface between the inflection and an end opposite the open end and the circumferential dimension of the inner surface is greater along the first portion of the inner surface than along the second portion of the inner surface; a probe assembly affixed to the interior of the elastomeric housing, the probe assembly comprising a contact probe having a first end and a second end, the first end of the contact probe coupled to the contact assembly and extending along a passage in the connector interface; a semi-conductive insert coupled to the contact assembly, the semi-conductive insert comprising a faraday cage the faraday cage comprising a first and a second end, wherein the inner surface extends from the first end of the faraday cage to the open end of the elastomeric insulating housing; and a ground plane positioned along the exterior of the elastomeric housing.

In one exemplary embodiment, a separable insulated connector device for a power distribution system has been described that includes an elastomeric housing comprising an interior, an exterior, and an open end, the interior of the housing comprising a connector interface, wherein the connector interface extends inward from the open end along the interior, the connector interface comprising; an inner surface defining a passage dimensioned to slidably receive a mating connector along an insertion axis; a plurality of inflections, each inflection comprising a dimple wherein a first portion of the dimple extends outward from the inner surface into the passage and a second portion of the dimple extending into the inner surface, the first portion of the dimple comprising an increased band of contact pressure with the mating connector and the second portion of the dimple comprising a pocket for receiving a lubricant; a probe assembly affixed to the interior of the elastomeric housing, the probe assembly comprising a contact probe having a first end and a second end, the first end of the contact probe coupled to the contact assembly and extending along a passage in the connector interface; a semi-conductive insert coupled to the contact assembly, the semi-conductive insert comprising a faraday cage the faraday cage comprising a first and a second end, wherein the inner surface extends from the first end of the faraday cage to the open end of the elastomeric insulating housing; and a ground plane positioned along the exterior of the elastomeric housing.

In one exemplary embodiment, a separable insulated connector device for a power distribution system has been described that includes an elastomeric housing comprising an interior, an exterior, and an open end, the interior of the housing comprising a connector interface, wherein the connector interface extends inward from the open end along the interior, the connector interface comprising; an inner surface defining a passage dimensioned to slidably receive a mating connector along an insertion axis; a plurality of inflections, each inflection comprising a geometric pattern wherein a first portion of the geometric pattern extends outward from the inner surface into the passage and a second portion of the geometric pattern extending into the inner surface, the first portion of the geometric pattern comprising an increased band of contact pressure with the mating connector and the second portion of the geometric patter comprising a pocket for receiving a lubricant; a probe assembly affixed to the interior of the elastomeric housing, the probe assembly comprising a contact probe having a first end and a second end, the first end of the contact probe coupled to the contact assembly and extending along a passage in the connector interface; a semi-conductive insert coupled to the contact assembly, the semi-conductive insert comprising a faraday cage the faraday cage comprising a first and a second end, wherein the inner surface extends from the first end of the faraday cage to the open end of the elastomeric insulating housing; and a ground plane positioned along the exterior of the elastomeric housing. In another exemplary embodiment, the geometric pattern is a quadrilateral. In another exemplary embodiment, the plurality of inflections comprises a waffle pattern.

In one exemplary embodiment, a separable insulated connector device for a power distribution system has been described that includes an elastomeric housing comprising an interior, an exterior, and an open end the interior of the housing comprising a connector interface, wherein the connector interface extends inward from the open end along the interior, the connector interface comprising: an inner surface defining a passage dimensioned to slidably receive a mating connector along an insertion axis; a plurality of inflections extending circumferentially on the inner surface, each inflection comprising an increased band of contact pressure with the mating connector; a plurality of troughs, the troughs positioned adjacent to and along a side of each inflection, each trough comprising a pocket of decreased contact pressure with the mating connector and capable of receiving a lubricant therein; wherein the circumferential dimension of the inner surface at the peak of each trough is less as each trough is positioned farther away from the open end; a probe assembly affixed to the interior of the elastomeric housing, the probe assembly comprising a contact probe having a first end and a second end, the first end of the contact probe coupled to the contact assembly and extending along a passage in the connector interface; a semi-conductive insert coupled to the contact assembly, the semi-conductive insert comprising a faraday cage the faraday cage comprising a first and a second end, wherein the inner surface extends from the first end of the faraday cage to the open end of the elastomeric insulating housing; and a ground plane positioned along the exterior of the elastomeric housing.

In one exemplary embodiment, a separable insulated connector device for making or breaking an energized connection in a power distribution network has been described that includes a contact means for extending along a passage in a connector interface and providing a contact point between the connector and a mating connector; a means for preventing a corona discharge in the along an interface between the connector and the mating connector when the connector and the mating connector are mated, the means comprising a conductive insert positioned around a portion of the contact means; a means for providing insulation around the contact means and the corona discharge prevention means, the insulation means defining an open ended interface having an inner surface, the interface extending about the contact means forward of the corona discharge prevention means and having a tapered circumferential dimension along an axis of the contact means; wherein the interface receives a means for slidable insertion into the interface; and wherein the inner surface comprises at least one pressure means comprising an inflection, wherein the pressure means extends into the interface from the insulation means and provides an increased amount of contact pressure on the means for slidable insertion into the interface. In another exemplary embodiment, the inner surface comprises a plurality of pressure means; each pressure means having a geometric shape. In another exemplary embodiment, the inner surface between the pressure means and one end of the insulation means comprises a means for retaining a lubricant between the insertion means and the inner surface. In another exemplary embodiment, the pressure means further comprises a means for retaining a lubricant between the insertion means and the inner surface.

In one exemplary embodiment, a switchgear has been described that includes a protective enclosure comprising a first end and a second end; a plurality of cables coupled to the lower end of the enclosure each cable coupled to a connector component wherein the connector component comprises and insulating connector and a mating connector and wherein the insulating connector comprises: a contact probe; a conductive insert defining a faraday cage around a portion of the probe; an elastomeric insulation housing surrounding the contact probe and the conductive insert, the housing defining an open ended connector interface, the connector interface extending about the probe forward of the conductive insert and having a tapered circumferential dimension along an axis of the probe; wherein the connector interface receives the mating connector; and wherein the connector interface comprises at least one inflection extending out from the inner surface into the connector interface, the inflection altering an amount of insertion force necessary to engage the mating connector; a plurality of switching components; each switching component coupled to one of the cables through the connector component; and an internal bus bar coupled to the switching components.

In one exemplary embodiment, a method has been described that includes the steps of providing an insulating housing, the housing configured to comprise an open end and a connector interface; positioning a contact assembly to an interior of the housing; coupling a contact probe to the contact assembly inside the housing, the contact probe configured to have a first end and a second end, the first end affixed to the contact assembly and the probe extending along a passage in the connector interface; associating a conductive extension member with the second end of the contact probe, the conductive extension member positioned to extend away from the connector interface; and providing at least one inflection along a surface of the connector interface, the inflection point generating an increased area of contact pressure with a mating connector. In another exemplary embodiment, the inflection extends circumferentially along the surface of the connector interface. In another exemplary embodiment, the method also includes providing the connector interface with a first rate of circumferential change between the open end and the inflection and providing the connector interface with a second rate of circumferential change between the inflection and the contact assembly. In another exemplary embodiment, the first rate of circumferential change is greater than the second rate of circumferential change. In another exemplary embodiment, the first rate of circumferential change is negative and the second rate of circumferential change is positive. In another exemplary embodiment, the method includes the steps of providing a plurality of inflections along the connector interface, each inflection having a geometric shape, a circumference of the geometric shape generating an increased area of contact pressure with the mating connector and providing a plurality of lower contact pressure areas along the connector interface, wherein each non-contact area is adjacent to at least one of the inflections. In another exemplary embodiment, each non-contact area is capable of receiving and storing a lubricant in the non-contact area when the mating connector is mated with the connector. In another exemplary embodiment, the geometric shape is a dimple. In another exemplary embodiment, the geometric shape is a parallelogram.

In one exemplary embodiment, a system for power distribution has been described that includes a power generating means for generating electricity; a power transmission means electrically coupled on a first end to the power generating means; a first electrical isolation means electrically coupled to a second end of the power transmission means; an electrical transforming means electrically coupled to the first electrical isolation means and a second electrical isolation means, wherein each electrical isolation means comprises: an elastomeric insulating means having an open end and means for interfacing a mating connector, the interfacing means extending inward from the open end and having an inner surface defining a passage dimensioned to slidably receive the mating connector along an axial insertion axis; wherein the circumferential dimension of the passage axis varies along the insertion axis; wherein the interfacing means further comprises at least one means for providing increased pressure along the mating connector, wherein the rate of change of the circumferential dimension is different before and after the increased pressure means; and at least one means for consuming the electricity. In another exemplary embodiment, the increased pressure means provides a band of contact pressure with the mating connector. In another exemplary embodiment, the increased pressure means comprises a plurality of increased pressure means, each comprising a geometric shape, wherein at least the circumference of the geometric shape provides increased pressure against the mating connector. In another exemplary embodiment, the geometric shape is a dimple. In another exemplary embodiment, the geometric shape is a parallelogram. In another exemplary embodiment, the change of circumferential dimension of the passage axis is greater between the open end and the increased pressure means than the change of circumferential dimension of the passage axis between the increased pressure means and an end opposite the open end.

In one exemplary embodiment, a system for power distribution has been described that includes a power generating plant for generating electrical power; at least one electrical transmission cable electrically coupled on a first end to the power generating plant; a high voltage switchgear electrically coupled to a second end of the electrical transmission cable; an electrical transformer electrically coupled to the high voltage switchgear and a lower voltage switchgear, wherein each switchgear comprises: a connector to the switchgear the connector comprising: an elastomeric insulating housing having an open end and a connector interface extending inward from the open end, the connector interface having an inner surface defining a passage dimensioned to slidably receive a mating connector along an axial insertion axis; wherein a circumferential dimension of the passage axis varies along the insertion axis; wherein the connector interface comprises at least one inflection extending circumferentially on the inner surface; and wherein a rate of change of the circumferential dimension is different before and after the inflection; and at least one consumer that consumes the generated electrical power. In another exemplary embodiment, the rate of change of the circumferential dimension is greater before the inflection point than after the inflection point. In another exemplary embodiment, the rate of change of the circumferential dimension is constant before the inflection. In another exemplary embodiment, the inflection point generates an increased band of contact pressure with the mating connector. In another exemplary embodiment, the inner surface includes multiple inflection points. In another exemplary embodiment, the inner surface before the inflection point provides a clearance for the mating connector, and the inner surface after the inflection point engages the mating connector. In another exemplary embodiment, the inflection marks a discontinuity in the inner surface. In another exemplary embodiment, the rate of change of the circumferential dimension is negative before the inflection and positive after the inflection. In another exemplary embodiment, the inner surface after the inflection is concave. In another exemplary embodiment, the connector interface includes a plurality of inflections, each inflection comprising a geometric shape, wherein at least the circumference of the geometric shape provides increased pressure against the mating connector. In another exemplary embodiment, the geometric shape is a dimple. In another exemplary embodiment, the geometric shape is a parallelogram. The interior of the geometric shape comprises a recessed area, wherein the recessed area is capable of receiving and storing a lubricant when a mating connector applies a force against the connector interface.

While the novel aspects have been described in terms of various specific embodiments, those skilled in the art will recognize that these aspects can be practiced with modification within the spirit and scope of the claims.

What is claimed is:

1. A separable insulated connector for a power distribution system, the connector comprising:
   an electrical contact;
   a conductive insert defining a faraday cage around a portion of the electrical contact;
   an elastomeric insulating housing having an open end and a connector interface extending inward from the open end, the connector interface having an inner surface defining a passage dimensioned to slidably receive a mating connector along an axial insertion axis;
   wherein the connector interface comprises a mouth;
   wherein a circumferential dimension of the passage varies along the insertion axis;
   wherein a region of the connector interface overlaps the faraday cage;
   wherein the connector interface comprises at least one inflection extending circumferentially on the inner surface, the at least one inflection being located between the mouth and the region of the connector interface that overlaps the faraday cage; and
   wherein a rate of change of the circumferential dimension is different before and after the inflection.

2. The connector of claim 1, wherein the rate of change of the circumferential dimension is greater before the inflection point than after the inflection point.

3. The connector of claim 1, wherein the rate of change of the circumferential dimension is constant before the inflection.

4. The connector of claim 1, wherein the inflection point generates an increased band of contact pressure with the mating connector.

5. The connector of claim 1, wherein the inflection marks a discontinuity in the inner surface.

6. The connector of claim 1, wherein the rate of change of the circumferential dimension is negative before the inflection and positive after the inflection.

7. A separable insulated connector for making or breaking an energized connection in a power distribution network, the connector comprising:
   an electrical contact;
   a conductive insert defining a faraday cage around a portion of the electrical contact;
   an elastomeric insulation housing surrounding the electrical contact and the conductive insert, the housing defining an open ended connector interface comprising a mouth, the connector interface extending about the electrical contact forward of the conductive insert and having a tapered circumferential dimension along an axis of the electrical contact;
   wherein the connector interface receives a mating connector;
   wherein a region of the connector interface overlaps the faraday cage; and
   wherein the connector interface comprises at least one inflection extending circumferentially on an inner surface thereof between the mouth and the region of the connector interface that overlaps the faraday cage, the inflection altering an amount of insertion force necessary to engage the mating connector.

8. The connector of claim 7, wherein a rate of change of the circumferential dimension is different before and after the inflection.

9. The connector of claim 8, wherein the rate of change of the circumferential dimension is constant before the inflection.

10. The connector of claim 8, wherein the rate of change of the circumferential dimension is greater before the inflection than after the inflection.

11. A separable insulated connector for a power distribution system, the connector comprising:
   an elastomeric housing comprising an interior, an exterior, a mouth, and an open end the interior of the housing comprising a connector interface,
   wherein the connector interface extends inward from the open end along the interior, the connector interface comprising:
   a mouth;
   an inner surface defining a passage dimensioned to slidably receive a mating connector along an insertion axis;
   an inflection extending circumferentially on the inner surface and comprising an increased band of contact pressure with the mating connector;
   wherein the rate of change of the circumferential dimension of the inner surface is greater along a first portion of the inner surface between the open end and the inflection than along a second portion of the inner surface between the inflection and an end opposite the open end and the circumferential dimension of the inner surface is greater along the first portion of the inner surface than along the second portion of the inner surface;
   a probe assembly affixed to the interior of the elastomeric housing, the probe assembly comprising a contact probe having a first end and a second end, the first end of the contact probe coupled to the contact assembly and extending along a passage in the connector interface;
   a semi-conductive insert coupled to the probe assembly, the semi-conductive insert comprising a faraday cage being overlapped by a region of the connector interface, the faraday cage comprising a first and a second end, wherein the inner surface extends from the first end of the faraday cage to the open end of the elastomeric insulating housing; and
   a ground plane positioned along the exterior of the elastomeric housing,
   wherein the inflection is located between the mouth and the region of the connector interface that overlaps the faraday cage.

12. The connector of claim 11, wherein the rate of change of the circumferential dimension is constant before the inflection.

13. A separable insulated connector for making or breaking an energized connection in a power distribution network, the connector comprising:
   a contact means for extending along a passage in a connector interface and providing a contact point between the connector and a mating connector;
   a means for preventing a corona discharge along an interface between the connector and the mating connector when the connector and the mating connector are mated, the means comprising a conductive insert positioned around a portion of the contact means;
   a means for providing insulation around the contact means and the corona discharge prevention means, the insulation means defining an open ended interface having a mouth and an inner surface, the interface extending about the contact means forward of the corona discharge prevention means and having a tapered circumferential dimension along an axis of the contact means;
   wherein a region of the interface overlaps the means for preventing corona discharge;
   wherein the interface receives a means for slidable insertion into the interface; and
   wherein the inner surface comprises at least one pressure means comprising an inflection located between the mouth and the region of the interface that overlaps the means for preventing corona discharge, and
   wherein the pressure means extends into the interface from the insulation means and provides an increased amount of contact pressure on the means for slidable insertion into the interface.

14. The connector of claim 13, wherein a rate of change of the circumferential dimension is different before and after the inflection.

15. The connector of claim 14, wherein the rate of change of the circumferential dimension is constant before the inflection.

16. The connector of claim 14, wherein the rate of change of the circumferential dimension is greater before the inflection than after the inflection.

17. A method comprising:
   providing an insulating housing, the housing configured to comprise an open end and a connector interface having a mouth;
   positioning a contact assembly to an interior of the housing;
   coupling a contact probe to the contact assembly inside the housing, the contact probe configured to have a first end and a second end, the first end affixed to the contact assembly and the probe extending along a passage in the connector interface;

providing a conductive insert defining a faraday cage around a portion of the contact probe such that the faraday cage is overlapped by a region of the contacts a region of the insulating housing;

associating a conductive extension member with the second end of the contact probe, the conductive extension member positioned to extend away from the connector interface; and providing at least one inflection along a surface of the connector interface, the inflection pint generating an increased area of contact pressure with a mating connector, wherein the at least one inflection is provided at a location between the mouth and the region of the connector interface that contacts the faraday cage.

18. The method of claim 17, wherein the surface of the connector interface comprises a tapered circumferential dimension.

19. The method of claim 18, wherein a rate of change of the circumferential dimension is different before and after the inflection.

20. The method of claim 19, wherein the rate of change of the circumferential dimension is greater before the inflection than after the inflection.

* * * * *